(12) United States Patent
Namose

(10) Patent No.: US 8,223,285 B2
(45) Date of Patent: Jul. 17, 2012

(54) ACTIVE MATRIX DEVICE, METHOD FOR MANUFACTURING SWITCHING ELEMENT, ELECTRO-OPTICAL DISPLAY DEVICE, AND ELECTRONIC APPARATUS

(75) Inventor: Isamu Namose, Suwa (JP)

(73) Assignee: Seiko Epson Corporation (JP)

( * ) Notice: Subject to any disclaimer, the term of this patent is extended or adjusted under 35 U.S.C. 154(b) by 922 days.

(21) Appl. No.: 12/266,774

(22) Filed: Nov. 7, 2008

(65) Prior Publication Data

US 2009/0120771 A1 May 14, 2009

(30) Foreign Application Priority Data

Nov. 9, 2007 (JP) ................................ 2007-292611
Aug. 6, 2008 (JP) ................................ 2008-203579

(51) Int. Cl.
*G02F 1/136* (2006.01)
*G09G 3/36* (2006.01)
(52) U.S. Cl. .......................................... 349/41; 345/98
(58) Field of Classification Search .................... 349/43, 349/41; 345/98
See application file for complete search history.

(56) References Cited

U.S. PATENT DOCUMENTS

| 4,681,403 | A | * | 7/1987 | Te Velde et al. ................. 349/41 |
| 5,748,159 | A |   | 5/1998 | Nishio et al. |
| 6,218,911 | B1 |   | 4/2001 | Kong et al. |
| 6,392,618 | B1 |   | 5/2002 | Kimura |
| 6,982,616 | B2 |   | 1/2006 | Nakanishi et al. |
| 7,209,019 | B2 |   | 4/2007 | Nakanishi et al. |
| 7,405,635 | B2 |   | 7/2008 | Hashimura et al. |
| 7,486,539 | B2 |   | 2/2009 | Jang et al. |
| 2007/0092180 | A1 | * | 4/2007 | Hashimura et al. ............. 385/16 |
| 2007/0121362 | A1 | * | 5/2007 | Jang et al. ....................... 365/94 |

FOREIGN PATENT DOCUMENTS

| JP | 58-018675 | 2/1983 |
| JP | 61-235820 | 10/1986 |
| JP | 01-156725 | 6/1989 |
| JP | 08-288062 | 11/1996 |
| JP | 11-174994 | 7/1999 |
| JP | 11-212059 | 8/1999 |
| JP | 2000-035591 | 2/2000 |
| JP | 2001-084884 | 3/2001 |

(Continued)

*Primary Examiner* — Nathanael R Briggs
(74) *Attorney, Agent, or Firm* — Harness, Dickey & Pierce, P.L.C.

(57) ABSTRACT

An active matrix device includes: a substrate; a pixel electrode formed at a side adjacent to one of surfaces of the substrate; a switching element, including: a fixed electrode formed so as to correspond to the pixel electrode and coupled with the pixel electrode; a movable electrode formed so as to be displaced toward the fixed electrode along a surface direction of the substrate to be in one of states being in contact with the fixed electrode and apart from the fixed electrode; a driving electrode formed so as to form an electrostatic gap between the movable electrode and the driving electrode, the fixed electrode, the movable electrode, and the driving electrode being disposed in different positions from each other along the surface direction of the substrate; a first wiring line coupled with the movable electrode; and a second wiring line coupled with the driving electrode. The switching element generates an electrostatic attraction between the movable electrode and the driving electrode by applying a voltage between the movable electrode and the driving electrode so as to displace the movable electrode to be in contact with the fixed electrode for obtaining electrical conduction between the first wiring line and the pixel electrode.

11 Claims, 16 Drawing Sheets

FOREIGN PATENT DOCUMENTS

| | | |
|---|---|---|
| JP | 2003-071798 | 3/2003 |
| JP | 2004-006782 | 1/2004 |
| JP | 2004-111360 | 4/2004 |
| JP | 2004-534280 | 11/2004 |
| JP | 2005-209625 | 8/2005 |
| JP | 2006-510066 | 3/2006 |
| JP | 2007-149318 | 6/2007 |
| WO | WO 03/007049 | 1/2003 |
| WO | WO 2004/059378 | 7/2004 |

* cited by examiner

ACTIVE MATRIX DEVICE, METHOD FOR MANUFACTURING SWITCHING ELEMENT, ELECTRO-OPTICAL DISPLAY DEVICE, AND ELECTRONIC APPARATUS

BACKGROUND

1. Technical Field

The present invention relates to an active matrix device, a method for manufacturing a switching element, an electro-optical display device, and an electronic apparatus.

2. Related Art

For example, a liquid crystal display (LCD) panel employing an active matrix driving system is provided with an active matrix device including a plurality of pixel electrodes, switching elements formed so as to respectively correspond to the pixel electrodes, wiring lines respectively coupled with the switching elements (e.g. refer to JP-A-2004-6782).

Typically, the active matrix device employs a thin film transistor (TFT) as a switching element. In such a TFT, an a-Si thin film or p-Si thin film is used for its semiconductor layer. Since such an a-Si thin film or p-Si thin film has photoconductivity, light leakage occurs when light is entered, thereby likely causing reduction of off resistance of the TFT or shift of threshold of the TFT.

In order to solve such a problem caused by light leakage, generally, a method by forming a shielding layer such as a black matrix that blocks light entering to a TFT is employed. However, when such a light shielding layer is formed, an aperture ratio of the panel is decreased, thereby reducing a light amount passing through the panel.

Therefore, an active matrix device (a backplane for an electro-optical display device) according to JP-A-2004-6782 employs a mechanical switching element instead of the TFT described above. Such a mechanical switching element does not cause light leakage. Therefore, the shielding layer is not required to be formed, thereby enhancing the aperture ratio. Further, unlike TFTs, the mechanical switching element does not cause variation in characteristics depending on a temperature, achieving excellent switching characteristics.

In the switching element according to JP-A-2004-6782, an actuator electrode is formed so as to face a cantilever. By energizing the actuator electrode, an electrostatic attraction is generated between the actuator electrode and the cantilever, so that the cantilever is displaced and comes in contact with a pixel electrode. This can make the pixel electrode and wiring be in a conductive state.

However, in the active matrix device described above, each switching element is formed on a substrate and includes the cantilever formed like a plate and having a surface parallel to a surface of the substrate. Therefore, an aperture ratio is reduced as much as an area occupied by the surface of the cantilever. Therefore, the active matrix device described above was not able to sufficiently provide an advantageous effect using a mechanical switching element (improvement of the aperture ratio).

If the area of the surface of the cantilever is reduced in order to enhance the aperture ratio, reducing the area of which the cantilever and the actuator electrode face to each other and concurrently reducing the electrostatic attraction generated therebetween. As a result, a driving voltage of the switching element is required to be increased.

SUMMARY

An advantage of the invention is to provide an active matrix device that can improve an aperture ratio while saving energy, a method for manufacturing a switching element, an electro-optical display device, and an electronic apparatus.

Such an advantage will be obtained as below.

An active matrix device according to a first aspect of the invention includes: a substrate; a pixel electrode formed at a side adjacent to one of surfaces of the substrate; a switching element, including: a fixed electrode formed so as to correspond to the pixel electrode and coupled with the pixel electrode; a movable electrode formed so as to be displaced toward the fixed electrode along a surface direction of the substrate to be in one of states being in contact with the fixed electrode and apart from the fixed electrode; a driving electrode formed so as to form an electrostatic gap between the movable electrode and the driving electrode, the fixed electrode, the movable electrode, and the driving electrode being disposed in different positions from each other along the surface direction of the substrate; a first wiring line coupled with the movable electrode; and a second wiring line coupled with the driving electrode. The switching element generates an electrostatic attraction between the movable electrode and the driving electrode by applying a voltage between the movable electrode and the driving electrode so as to displace the movable electrode to be in contact with the fixed electrode for obtaining electrical conduction between the first wiring line and the pixel electrode.

The active matrix device that can further improve an aperture ratio while achieving energy savings can be thus provided.

In the active matrix device, it is preferable that the fixed electrode, the movable electrode, and the driving electrode be formed in a sheet-like shape and disposed so that each surface of the fixed electrode, the movable electrode, and the driving electrode are nearly orthogonal to the surface of the substrate.

This can make each area of the movable electrode, the fixed electrode, and the driving electrode extremely small in plan view of the substrate. As a result, an extremely high aperture ratio is obtained.

In the active matrix device, the fixed electrode, the movable electrode, and the driving electrode are preferably formed to extend in a direction parallel to one of the first wiring line and the second wiring line.

This can reduce an area of the switching element overlapping with the pixel electrode in plan view of the substrate. As a result, the aperture ratio can be improved.

In the active matrix device, it is preferable that the movable electrode be cantilever-supported so that a free end is displaced, and the fixed electrode be disposed so as to face an end portion of the movable electrode at a side adjacent to the free end, while the driving electrode be disposed so as to face a portion of the movable electrode closer to a side adjacent to a fixed end of the movable electrode than a position of the fixed electrode.

This can simplify the configuration of the switching element. Further, since the driving electrode faces the fixed end of the fixed electrode, when the movable electrode is displaced (bent and deformed) toward a side adjacent to the driving electrode, a reaction force of the movable electrode to return to the original state is large. Therefore, adhesion of the driving electrode and the movable electrode is securely prevented.

In the active matrix device, the fixed electrode, the movable electrode, and the driving electrode are preferably arranged so that the movable electrode contacts the fixed electrode while the movable electrode and the driving electrode are apart from each other.

This can prevent adhesion of the driving electrode and the movable electrode.

In the active matrix device, it is preferable that at least one of surfaces of the movable electrode and the fixed electrode that are facing to each other have a protrusion to prevent a contact of the movable electrode with the driving electrode.

Therefore, the movable electrode can more securely and simply come in contact with the fixed electrode, while the movable electrode and the driving electrode are apart from each other.

In the active matrix device, it is preferable that the switching element further include a housing portion having an airtight space and accommodating the movable electrode, the driving electrode, and the fixed electrode therein.

This can prevent degradation of each part of the switching element. Therefore, excellent switching characteristics are shown for a prolonged period of time.

In the active matrix device, it is preferable that the pixel electrode be formed in a different position from a position of switching element in a thickness direction of the substrate so as to cover and include the switching element corresponding to the pixel electrode in plan view.

This can improve the aperture ratio.

In the active matrix device, it is preferable that the first wiring line be formed in a plural number so as to be parallel to each other along the substrate, while the second wiring line be formed in a plural number so as to be parallel to each other along the substrate and intersect with the first wiring lines, and the switching element be formed in a vicinity of each of intersections of the first wiring lines and the second wiring lines.

The plurality of switching elements corresponding to the plurality of pixel electrodes arranged in a matrix can be thus arranged.

A method for manufacturing the switching element included in the active matrix device of the first aspect of the invention above according to a second aspect of the invention includes: forming a step portion having a wall surface formed on one of the surfaces of the substrate, the wall surface being perpendicular to the surface of the substrate; forming a first electrode on the wall surface; forming an insulating layer having an insulating property so as to cover the first electrode; forming a second electrode on the insulating layer so as to face the first electrode through the insulating layer; removing a part of the insulating layer so as to form an electrostatic gap between the first electrode and the second electrode and allow the second electrode to be displaced to be in one of states being in contact with the first electrode and apart from the first electrode. The first electrode serves as the driving electrode while the second electrode serves as the movable electrode.

When the driving electrode and the movable electrode are formed from the same layer, the distance between the driving electrode and the movable electrode is limited in accordance with a minimum width of a line or a space that can be formed by photolithography, allowing not more than one switching element to be formed in the minimum width. On the other hand, in the method for manufacturing the switching element according to the second aspect of the invention, the distance between the driving electrode and the movable electrode is not limited by the minimum width of a line or a space that can be formed by photolithography, allowing two switching elements to be formed in the minimum width. Therefore, when a peripheral circuit or the like is formed by employing the switching element, reduction of the designed size is achieved.

Further, a size of the distance between the movable electrode and the driving electrode (that is an electrostatic gap) can be defined by the thickness of the insulating layer. Therefore, the electrostatic gap can be also reduced in size. As a result, a driving voltage of the switching element can be reduced. Further, since a space required for mounting the switching element is small, a freedom in designing the active matrix device is improved. Further, the distance between the movable electrode and the driving electrode is accurately defined, thereby achieving stable switching characteristics.

An electro-optical display device according to a third aspect of the invention includes the active matrix according to the first aspect of the invention.

This enables a higher quality image to be displayed, while achieving energy savings.

An electronic apparatus according to a fourth aspect of the invention includes the electro-optical display device according to the third aspect of the invention.

This enables a higher quality image to be displayed, while achieving energy savings.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of an active matrix device, an electro-optical display, a method for manufacturing a switching element, and an electronic apparatus according to the invention will now be described with reference to accompanying drawings.

[First Embodiment]

Figure 1:
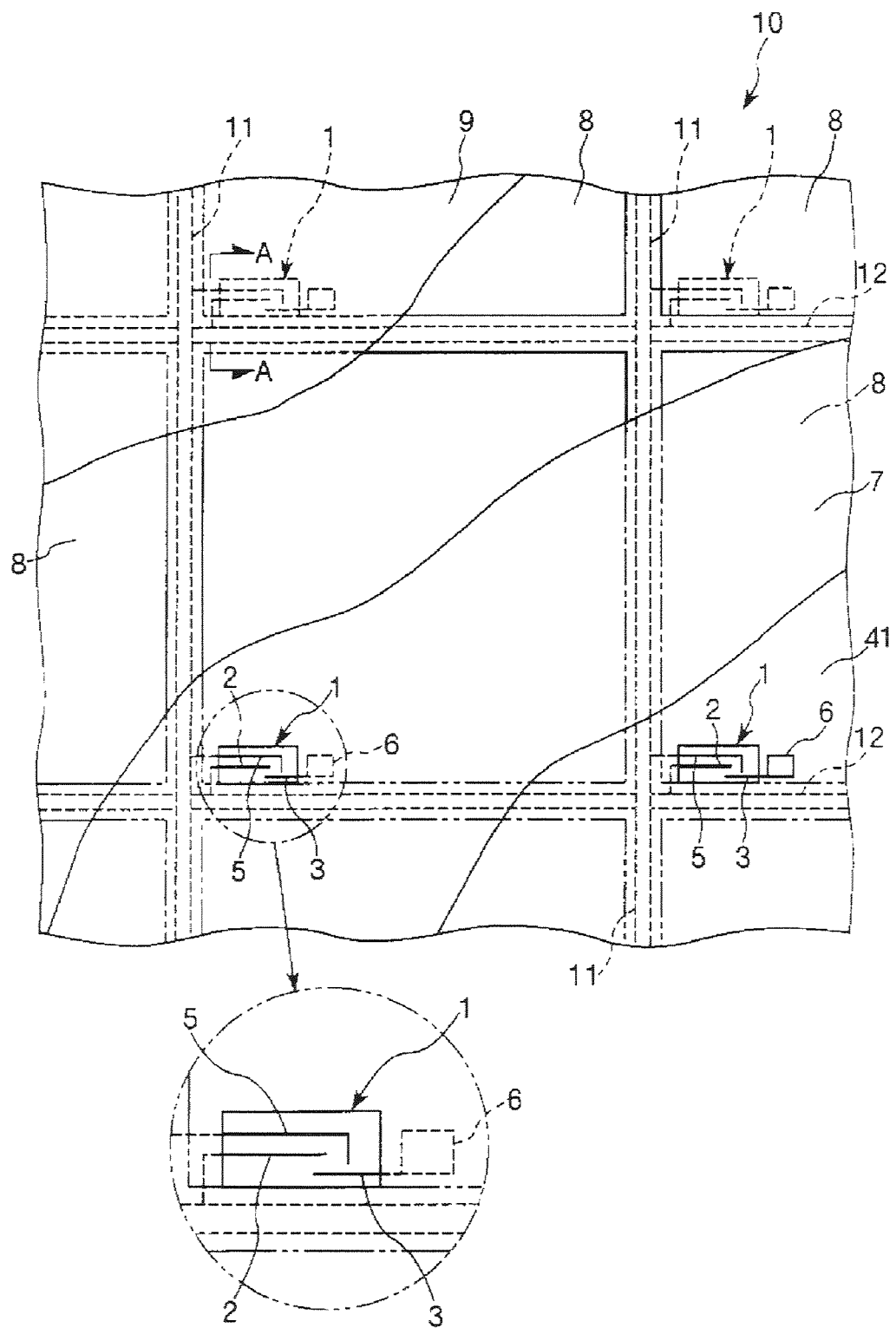
FIG. 1 is a plan view showing an active matrix device according to a first embodiment of the invention.
Figure 2:
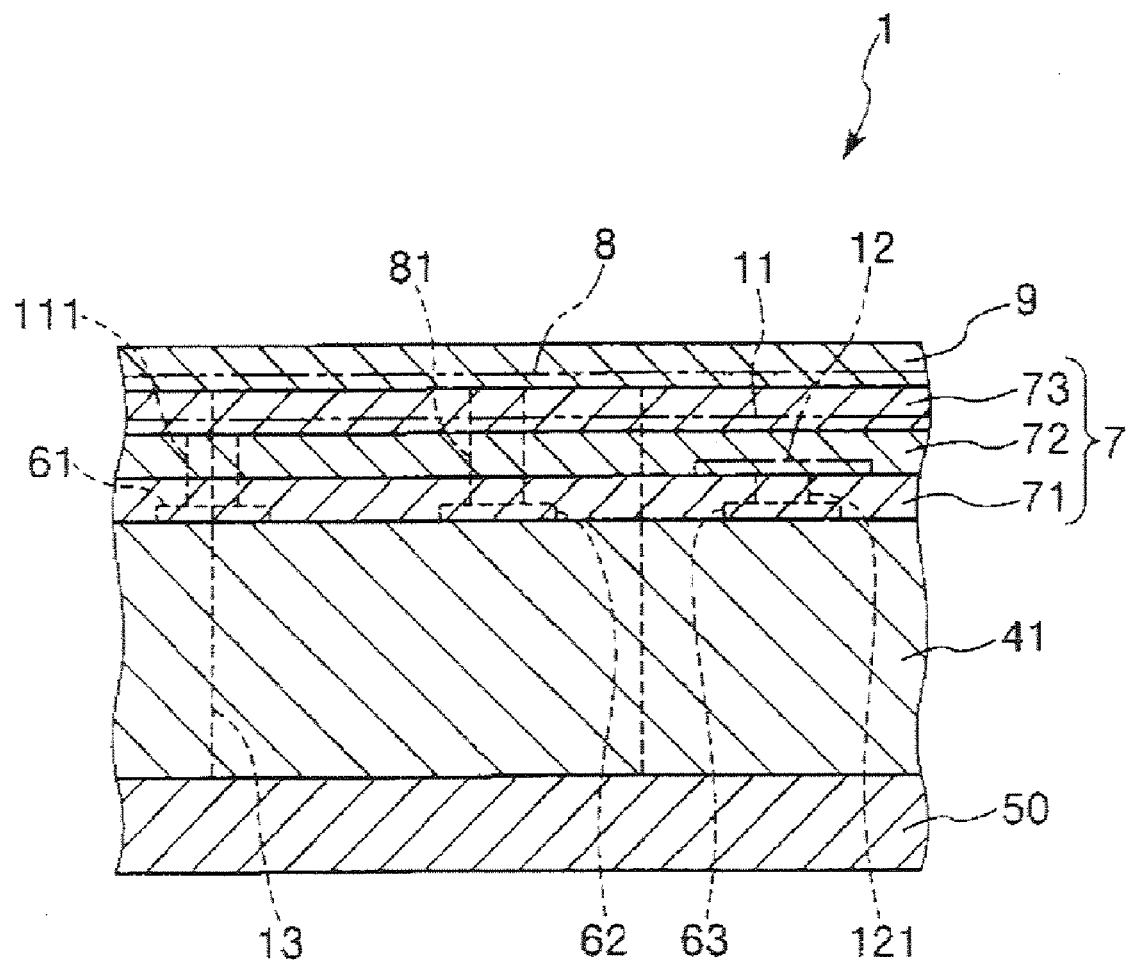
FIG. 2 is a sectional view taken along a line A-A in FIG. 1.
Figure 3:
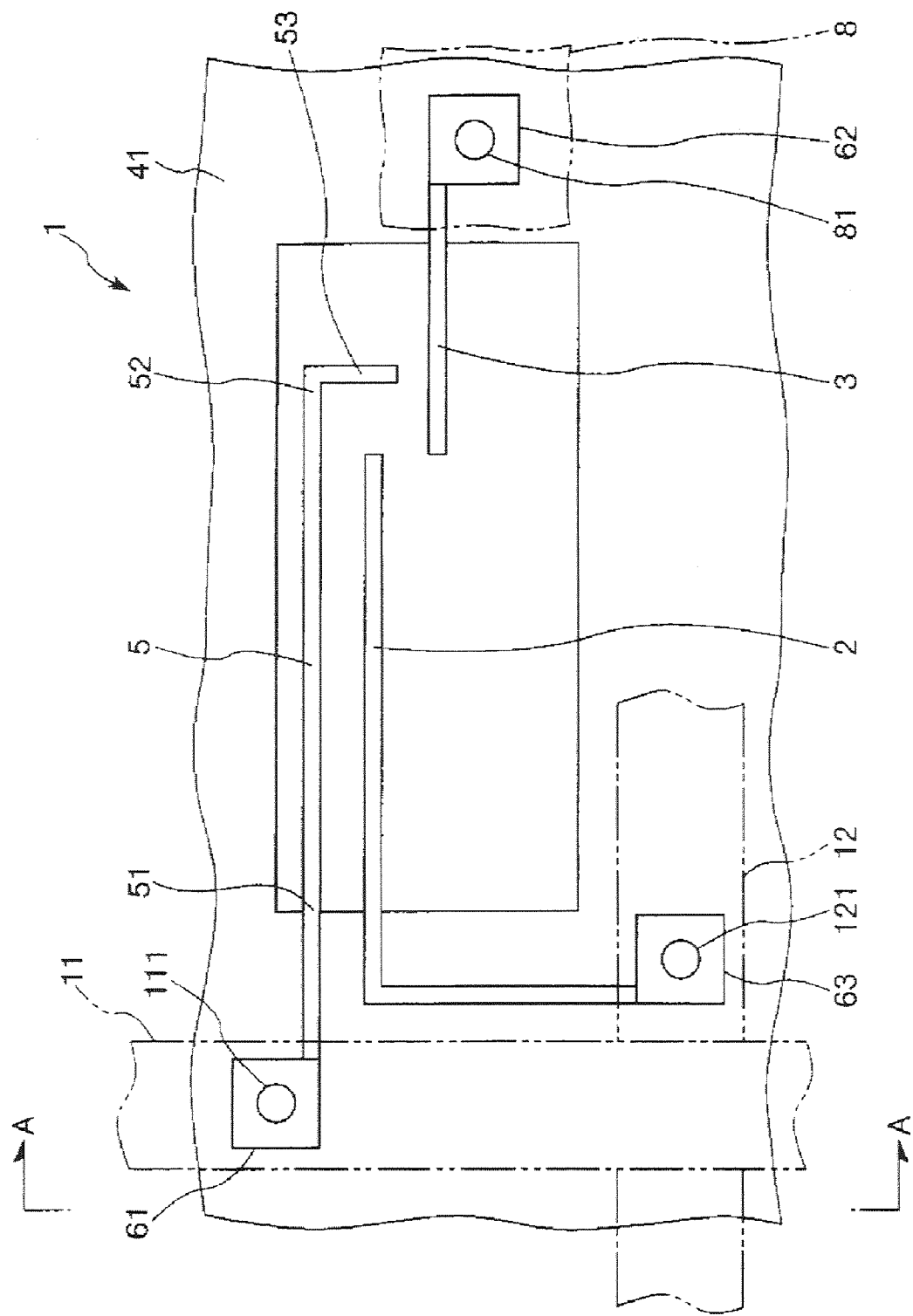
FIG. 3 is an enlarged plan view for explaining a switching element included in the active matrix device shown in FIG. 1.
Figure 4:
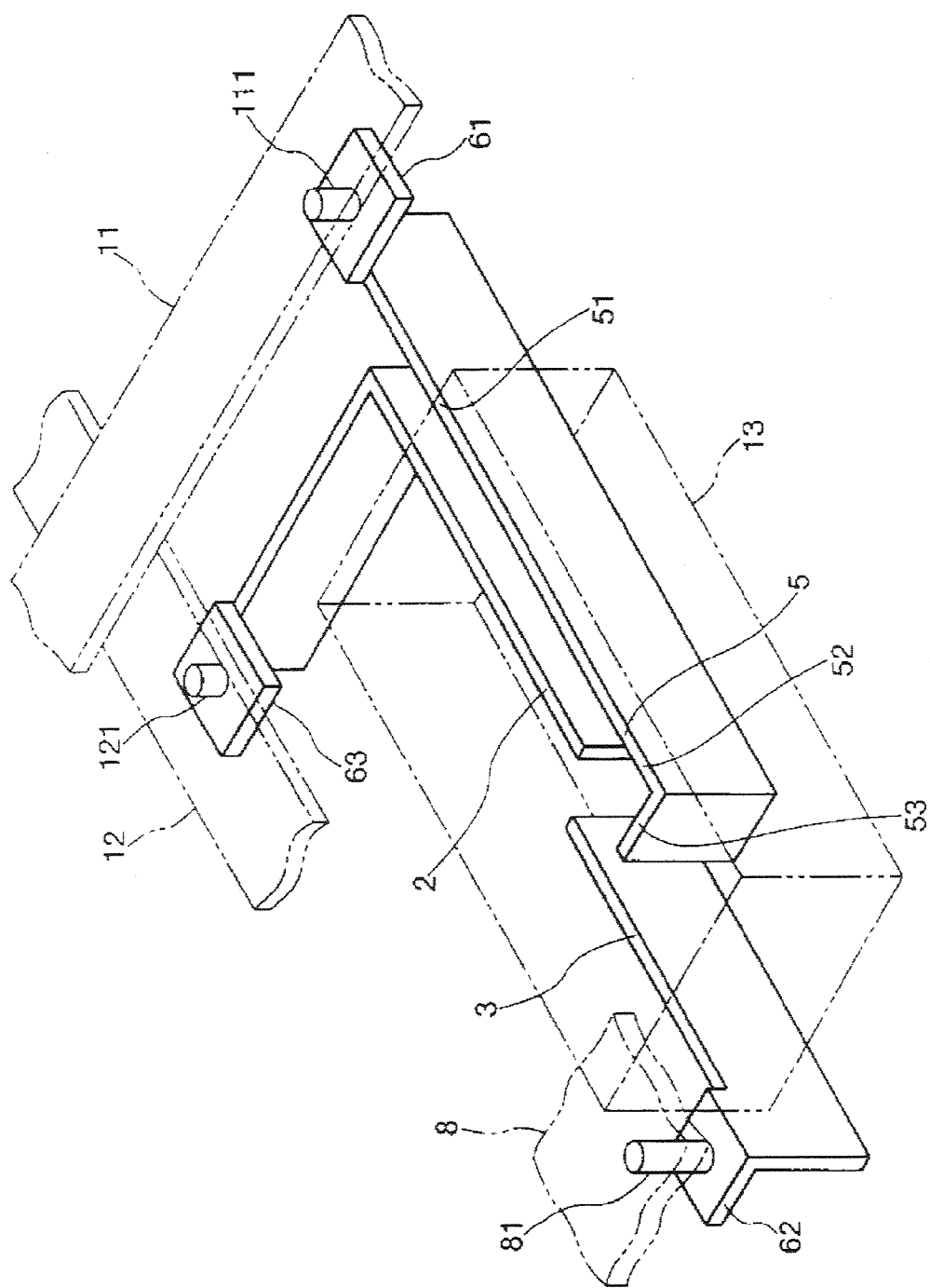
FIG. 4 is a perspective view for explaining the switching element shown in FIG. 3.
Figure 5:
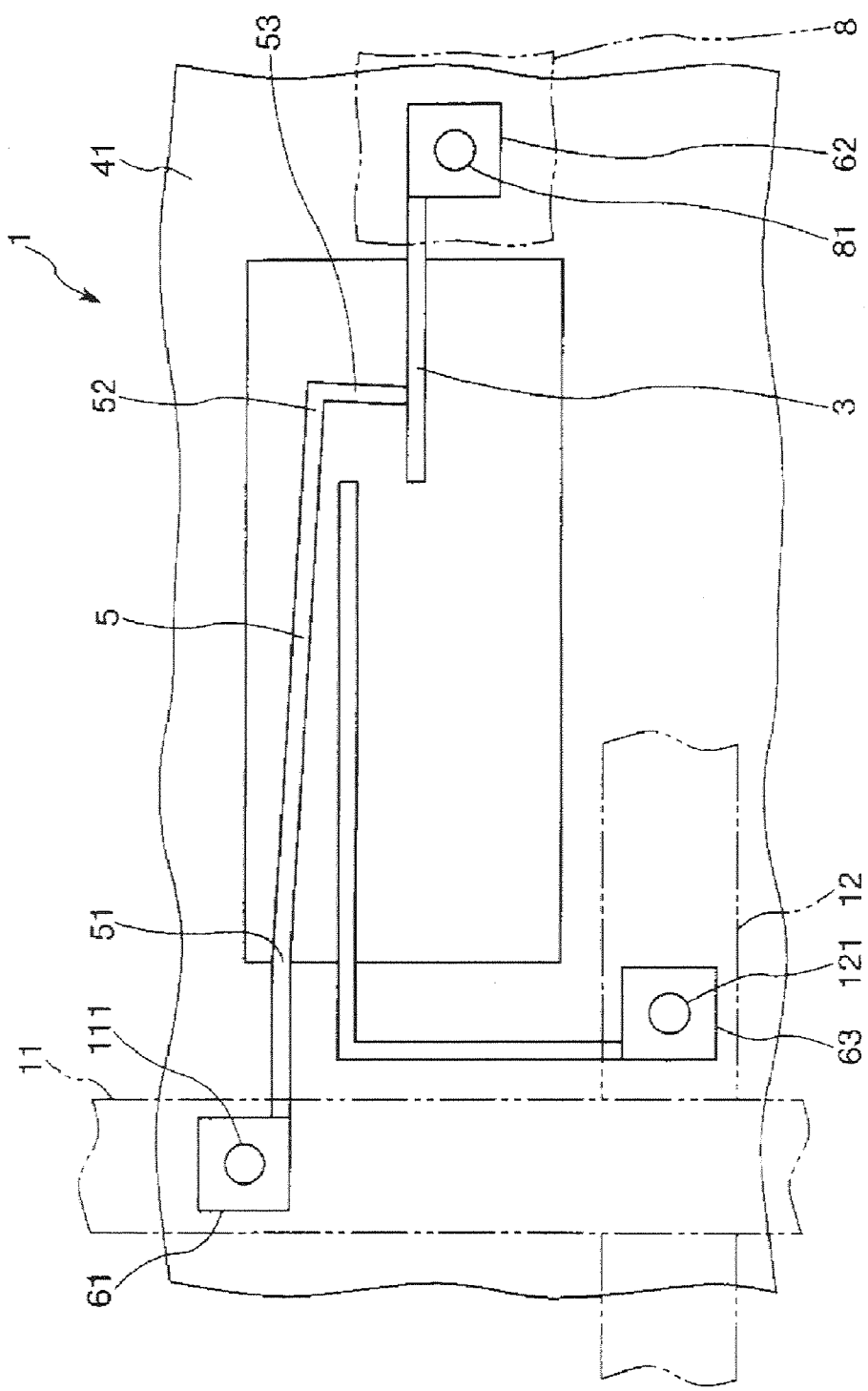
FIG. 5 is a diagram for explaining an operation of the switching element shown in FIG. 3.

FIG. 1 is a plan view showing an active matrix device according to a first embodiment of the invention. FIG. 2 is a sectional view taken along a line A-A in FIG. 1. FIG. 3 is an enlarged plan view for explaining a switching element included in the active matrix device shown in FIG. 1. FIG. 4 is a perspective view for explaining the switching element shown in FIG. 3, while FIG. 5 is a diagram for explaining an operation of the switching element shown in FIG. 3. For expository convenience, the front side, the rear side, the right side, and the left side in FIG. 1 are described as "top," "bottom," "right," and "left" respectively. Likewise, the top side, the bottom side, the right side, and the left side in FIG. 2 and FIG. 4 are described as "top," "bottom," "right," and "left" respectively.

[Active Matrix Device]

An active matrix device 10 shown in FIG. 1 includes a plurality of first wiring lines 11, a plurality of second wiring lines 12, a plurality of switching elements 1, and a plurality of pixel electrodes 8 that are formed on a substrate 50. The plurality of second wiring lines 12 intersect with the plurality of first wiring lines 11. The plurality of switching elements 1 are respectively formed in the vicinities of the intersections of the first wiring lines 11 and the second wiring lines 12, and the plurality of pixel electrodes 8 are formed so as to respectively correspond to the switching elements 1.

The substrate 50 is a support (supporting body) to support each element (each layer) constituting the active matrix device 10.

The following substrates can be used as the substrate 50, for example: a glass substrate; a plastic substrate (resin substrate) made of polyimide, polyethylene terephthalate (PET), polyethylene naphthalate (PEN), polymethylmethacrylate (PMMA), polycarbonate (PC), polyethersulphone (PES), aromatic polyester (liquid crystal polymer), or the like; a quartz substrate; a silicon substrate; and a gallium arsenide substrate.

An average thickness of the substrate 50 is not particularly limited and slightly varies depending on their constituent materials. However, it is preferable to be from about 10 μm to about 2000 μm, and more preferably from about 30 μm to about 300 μm. If the thickness of the substrate 50 is too thin, a function as a supporting body is not secured resulting from reduction of strength of the substrate 50. On the other hand, if the substrate 50 is too thick, it is unfavorable for achieving lightweight.

The plurality of first wiring lines 11 is formed parallel to one another along the substrate 50, while the plurality of second wiring lines 12 intersects with the plurality of first wiring lines 11 and formed parallel to one another along the substrate 50.

In the embodiment, the plurality of first wiring lines 11 and the plurality of second wiring lines 12 are arranged so as to orthogonally intersect with each other. Further, the plurality of first wiring lines 11 is for a row selection, while the plurality of second wiring lines 12 is for a column selection. That is, one of the first wiring lines 11 and the second wiring lines 12 serves as data lines, while the other serves as scan lines. The row selection and the column selection are performed by using the plurality of first wiring lines 11 and the plurality of second wiring lines 12 described above, selectively operating a desired switching element 1 among the switching elements 1 (applying a voltage between a movable electrode 5 and a driving electrode 2).

Resulting from respectively forming the switching elements 1 in the vicinities of the intersections of the first wiring lines 11 and the second wiring lines 12 arranged as described above, the switching elements 1 are arranged so as to correspond to the plurality of pixel electrodes 8 arranged in a matrix.

Constituent materials of the first wiring lines 11 and the second wiring lines 12 are not particularly limited as long as having electrical conductivity. For example, one or a combination of two or more of the following substances can be used as the respective materials: conductive materials such as Pd, Pt, Au, W, Ta, Mo, Al, Cr, Ti, Cu, and an alloy including these elements; conductive oxides such as ITO, FTO, ATO, and $SnO_2$; carbon materials such as carbon black, carbon nanotube, and fullerene; and conductive polymer materials such as polyacetylene, polypyrrole, polythiophene like poly-ethylenedioxythiophene (PEDOT), polyaniline, poly(p-phenylene), polyfluorene, polycarbazole, polysilane, and a derivative of these substances. The conductive polymer material described above is typically used after being doped with a high molecular weight material of iron oxide, iodine, inorganic acid, organic acid, or polystyrene sulfonic acid so as to be endowed with electrical conductivity. Among these materials, as the constituent material of each of the first wiring lines 11 and the second wiring lines 12, those composed mainly of Al, Au, Cr, Ni, Cu, or Pt, or an alloy including any of these materials are favorably used. Resulting from using these metal materials, the first wiring lines 11 and the second wiring lines 12 can be easily formed at low cost using an electrolytic or electroless plating method. Further, characteristics of the active matrix device 10 are improved.

As shown in FIG. 2, in the embodiment, one surface (upper surface) of the substrate 50 has a first insulating layer 41 formed thereon for forming each part of the switching elements 1.

Further, the first insulating layer 41 has terminals 61, 62, and 63 formed thereon and a second insulating layer 71 covering the terminals 61, 62, and 63. The terminals 61, 62, and 63 are respectively coupled with electrodes of the switching elements 1 to be described later.

Further, the second insulating layer 71 has the plurality of second wiring lines 12 that is formed thereon and a third insulating layer 72 that is formed so as to cover the plurality of second wiring lines 12.

The third insulating layer 72 has the plurality of first wiring lines 11 that is formed thereon, and a fourth insulating layer 73 that is formed so as to cover the plurality of first wiring lines 11.

Each of the insulating layers 41, 71, 72, and 73 is partially removed so as to form a housing portion (removed part) 13 to accommodate a driving part of the switching elements 1 to be described later.

Further, each of a penetration electrode 111, a penetration electrode portion 81, and a penetration electrode portion 121 is formed to penetrate through the second insulating layer 71. The penetration electrode 111 couples the terminal 61 with the first wiring line 11, and the penetration electrode portion 81 couples the terminal 62 with the pixel electrode 8, while the penetration electrode portion 121 couples the terminal 63 with the second wiring line 12.

Further, each of the penetration electrode 111, and the penetration electrode portion 81 is formed to penetrate through the third insulating layer 72. The penetration electrode 111 couples the terminal 61 with the first wiring line 11, and the penetration electrode portion 81 couples the terminal 62 with the pixel electrode 8.

Further, the penetration electrode portion 81 for coupling the terminal 62 with the pixel electrode 8 penetrates through the fourth insulating layer 73.

Constituent materials of the insulating layers 41, 71, 72, and 73 are not particularly limited as long as having an insulating property, and thus various organic materials (in particular, organic polymer), or various inorganic materials can be used.

Examples of such materials having an insulating property include: acrylic resin such as polystyrene, polyimide, polyamideimide, polyvinylphenylene, polycarbonate (PC) and polymethylmethacrylate (PMMA); fluorine resin such as polytetrafluoroethylene (PTFE); phenol resin such as polyvinylphenol and novolac resin; and olefin resin such as polyethylene, polypropylene, polyisobutylene, and polybutene. One or a combination of two or more of these materials can be used.

Further, examples of such inorganic materials having an insulating property include: metal oxides such as silica ($SiO_2$); silicon nitride; aluminum oxide; tantalum oxide; metal compound oxides such as barium strontium titanate; and lead zirconate titanate. One or a combination of two or more of these materials can be used.

Each of the pixel electrodes 8 is formed on one of surfaces of the substrate 50 described above, and constitutes one of electrodes for applying a voltage to operate each pixel when a liquid crystal panel 100 described later by employing the active matrix device 10 is structured.

In the embodiment, the pixel electrodes 8 are respectively formed in regions surrounded by two of the first wiring lines 11 that are adjacent to each other and two of the second wiring lines 12 that are adjacent to each other in plan view.

In particular, the plurality of pixel electrodes 8 is formed in a position (upper position) that is different from a position where the plurality of switching elements 1 is formed in a thickness direction of the substrate 50 so as to include the switching elements 1 respectively corresponding to the pixel electrodes 8 in plan view. This structure can maximally enlarge an area of each of the pixel electrodes 8, and improve an aperture ratio.

Examples of a constituent material of the pixel electrodes 8 includes: metal such as Ni, Pd, Pt, Li, Mg, Ca, Sr, La, Ce, Er, Eu, Sc, Y, Yb, Ag, Cu, Co, Al, Cs, and Rb, an alloy including them such as MgAg, AlLi, CuLi, oxide such as Indium Tin Oxide (ITO), $SnO_2$, $SnO_2$ containing Sb, and ZnO containing Al. One or a combination of two or more of these materials can be used. In particular, when the active matrix device 10 is applied to the transmissive liquid crystal panel 100 described later, a transparent material is selected as the constituent material of the pixel electrodes 8 among the materials described above.

Further, a part of the bottom surface of each of the pixel electrodes 8 (surface at a side adjacent to the substrate 50) constitutes a part of a wall surface of the housing portion 13 described above, and a through hole (not shown) is formed in each of the pixel electrodes 8. The through hole is used for supplying an etchant when the housing portion 13 is formed in a manufacturing step described later. The through hole is sealed by a sealing layer 9.

A constituent material of the sealing layer 9 is not particularly limited as long as having a function to seal the through hole described above, and thus various organic materials and inorganic materials can be used. However, it is preferable to use high polymer materials such as polyimide resin, polyamideimide resin, polyvinyl alcohol, polytetrafluoroethylene and the like. Therefore, the sealing layer also servers as a light distribution film as shown in the liquid crystal panel 100 described later.

Each of the pixel electrodes 8 is coupled with each of the switching elements 1 that are formed corresponding to the pixel electrodes 8 via the terminal 62 and the penetration electrode portion 81 described later. Therefore, controlling the operation of the switching elements 1 enables controlling an operation of each pixel in the liquid crystal panel 100 as described later.

As shown in FIGS. 3 and 4, each of the switching elements 1 includes the driving electrode 2, a fixed electrode 3, and the movable electrode (switching element) 5. The driving electrode 2 is electrically coupled with the second wiring lines 12 corresponding thereto, and the fixed electrode 3 is electrically coupled with the pixel electrodes 8 corresponding thereto, while the movable electrode 5 is electrically coupled with the first wiring lines 11 corresponding thereto.

Each element making up the switching elements 1 will be sequentially described below in detail.

The driving electrode 2 is in a sheet-like shape and formed so that a surface of the driving electrode 2 is nearly orthogonal to the surface of the substrate 50. Further, the driving electrode 2 has a shape of a letter L in plan view, and includes a portion extending along the first wiring lines 11 and a portion extending along the second wiring lines 12.

Further, the driving electrode 2 is separated respectively from the substrate 50 and the pixel electrodes 8. In other words, the driving electrode 2 is separated respectively from the bottom surface and the upper surface of the housing portion 13.

The driving electrode 2 as above is disposed facing the movable electrode 5 via an electrostatic gap as described later.

The driving electrode 2 generates an electrostatic attraction between the movable electrode 5 and the driving electrode 2 (electrostatic gap) by applying a voltage therebetween (generating a potential difference).

The driving electrode 2 as above is electrically coupled with the second wiring line 12 via the penetration electrode portion 121 and the terminal 63. In the embodiment, the driving electrode 2 and the terminal 63 are integrally formed.

A constituent material of the driving electrode 2 is not particularly limited as long as having conductivity. For example the same material constituting the first wiring lines 11 and the second wiring lines 12 can be used.

Further, the thickness of the driving electrode 2 is not particularly limited, but is preferably in a range from about 10 to 1000 nm inclusive, more preferably in a range from about 50 to 500 nm inclusive.

The fixed electrode 3 is formed in a sheet-like shape and has a surface nearly orthogonal to the surface of the substrate 50. Further, the fixed electrode 3 has a linear shape in plan view and disposed at an interval from the driving electrode 2 described above.

Further, the fixed electrode 3 is formed at a nearly same position as that of the driving electrode 2 in the thickness direction of the substrate 50.

The fixed electrode 3 is electrically coupled with the first wiring line 11 by coming in contact with the movable electrode 5.

The fixed electrode 3 as above is electrically coupled with the pixel electrode 8 via the terminal 62 and the penetration electrode portion 81.

A constituent material of the fixed electrode 3 is not particularly limited as long as having conductivity. For example the same material constituting the first wiring lines 11 and the second wiring lines 12 can be used.

Further, the thickness of the fixed electrode 3 is not particularly limited, but is preferably in a range from about 10 to 1000 nm inclusive, and more preferably in a range from about 50 to 500 nm inclusive.

The movable electrode 5 is formed in a sheet-like shape so that a surface of the movable electrode 5 is nearly orthogonal to the surface of the substrate 50. Further, the movable electrode 5 extends mainly along the second wiring lines 12 in plan view and faces the driving electrode 2 and the fixed electrode 3 described above.

Further, the movable electrode 5 is formed at a nearly same position as that of the driving electrode 2 and the fixed electrode 3 in the thickness direction of the substrate 50.

The movable electrode 5 has an elongated shape (i.e. strip), and an end 51 at a side adjacent to the first wiring line 11 (end in the left side in FIG. 3) in its longitudinal direction is fixed, thus being cantilever-supported. The movable electrode 5 can thus displace a free end 52 thereof toward the driving electrode 2 and the fixed electrode 3 (i.e. the bottom side).

Further, an end portion of the movable electrode 5, that is a portion of the movable electrode 5 facing the fixed electrode 3, has a protrusion 53 formed thereon.

The protrusion 53 is formed so as to prevent a contact of the movable electrode 5 and the driving electrode 2, and serves as adhesion prevention preventing the movable electrode 5 from adhering to the driving electrode 2. Therefore, the movable electrode 5 and the driving electrode 2 can keep a distance to be apart from each other, while the movable electrode 5 can come in contact with the fixed electrode 3.

Accordingly, the movable electrode 5 is formed so as to be displaced as the movable electrode 5 comes in contact with or apart from the fixed electrode 3.

A constituent material of the movable electrode 5 is not particularly limited as long as having conductivity and being elastically deformable. For example, a silicon material such as single crystal silicon, polysilicon, amorphous silicon, and silicon and carbide, a metal material such as stainless steel, titanium, and aluminum, or a mixed material made of one or more of the materials above can be used.

In the embodiment, the driving electrode 2, the fixed electrode 3, and the movable electrode 5 as described above are accommodated in the housing portion 13 that is formed between the pixel electrodes 8 and the substrate 50.

Inside of the housing portion 13 may be in a reduced pressure condition, filled with a non-oxygenated gas, or filled with a liquid having an insulating property.

Further, the housing portion 13 as above forms an air-tight space. This can prevent degradation of each element of the switching elements 1. Therefore, excellent switching characteristics are exhibited for a prolonged period of time. Further, since this can prevent the movable electrode 5 from receiving influence from outside, the switching elements 1 can show stable driving characteristics. In addition, the housing portion 13 is formed for each of the switching elements 1, preventing influence between the switching elements 1.

In each of the switching elements 1 as above, when a voltage is not applied between the movable electrode 5 and the driving electrode 2, as shown in FIGS. 3 and 4, the movable electrode 5 and the fixed electrode 3 are separated from each other, and energization from the first wiring lines 11 to the pixel electrodes 8 is cut off.

Further, resulting from applying a voltage between the movable electrode 5 and the driving electrode 2, an electrostatic attraction is generated between the movable electrode 5 and the driving electrode 2, and then the movable electrode 5 is made to be in contact with the fixed electrode 3 as shown in FIG. 5. The energization from the first wiring lines 11 to the pixel electrodes 8 is thus obtained.

The switching elements 1 with such a mechanical function as above has excellent light resistance compared to TFT. Further, unlike TFT, the switching elements 1 described above cause no light leakage. Therefore, without forming a light shielding layer such as a black matrix for light shielding of the switching elements 1, an aperture ratio of the active matrix device 10 can be made larger. Further, the switching elements 1 do not have characteristic variation by a temperature, thereby simplifying a cooling mechanism of the active matrix device 10. Furthermore, the switching elements 1 can perform a higher speed switching operation compared to TFTs.

In the switching elements 1 as described above, the fixed electrode 3, the movable electrode 5, and the driving electrode 2 are disposed in different positions from each other in a direction along the surface of the substrate 50. The movable electrode 5 is structured so as to be displaced toward a side adjacent to the fixed electrode 3 in the direction along the surface of the substrate 50.

This structure can prevent an area of each of the electrodes in plan view from enlarging even if an area of the electrode surface of each of the electrodes (in particular, areas of the movable electrode 5 and the driving electrode 2 facing to each other) is enlarged as described above. Therefore, without increasing a driving voltage for the switching elements 1, the aperture ratio is improved. That is, while achieving energy savings, a maximum advantageous effect by using such a mechanical switching element is obtained, further improving the aperture ratio.

In particular, in the embodiment, the fixed electrode 3, the movable electrode 5, and the driving electrode 2 are each formed in a sheet-like shape, and the surfaces thereof are nearly orthogonal to the surface of the substrate 50. Therefore, each area of the fixed electrode 3, the movable electrode 5, and the driving electrode 2 can be extremely reduced in plan view. As a result, an extremely high aperture ratio is obtained.

In addition, the fixed electrode 3, the movable electrode 5, and the driving electrode 2 are respectively extended in a direction parallel to the first wiring lines 11 or the second wiring lines. Therefore, each area of the switching elements 1 and the pixel electrodes 8 overlapping to each other can be reduced in plan view of the substrate 50. As a result, the aperture rate can be improved.

As described above, the movable electrode 5 is cantilever-supported so that the free end 52 is displaced. The fixed electrode 3 is disposed so as to face an end portion of the movable electrode 5 at a side adjacent to the free end 52, while the driving electrode 2 is disposed so as to face a portion of the movable electrode 5 closer to a side adjacent to a fixed end of the movable electrode than a position of the fixed electrode. Further, in the fixed electrode 3, the driving electrode 2, and the movable electrode 5, as shown in FIG. 5, while the movable electrode 5 and the driving electrode 2 are apart from each other, the movable electrode 5 comes in contact with the fixed electrode 3. This can prevent adhesion of the movable electrode 5 and the driving electrode 2.

In particular, the movable electrode 5 is structured to be cantilever-supported as described above, thus simplifying the structure of the switching elements 1. Further, since the driving electrode 2 faces the fixed end of the movable electrode 5, when the movable electrode 5 is displaced (bent and deformed) toward a side adjacent to the driving electrode 2, a reaction force of the movable electrode 5 to return to the original state is large. Therefore, the adhesion of the driving electrode 2 and the movable electrode 5 is securely prevented.

[Method for Manufacturing Active Matrix Device]

Next, referring to FIGS. 6A through 8C, an example of methods for manufacturing the active matrix device 10 according to the embodiment will be described.

Figure 6A:
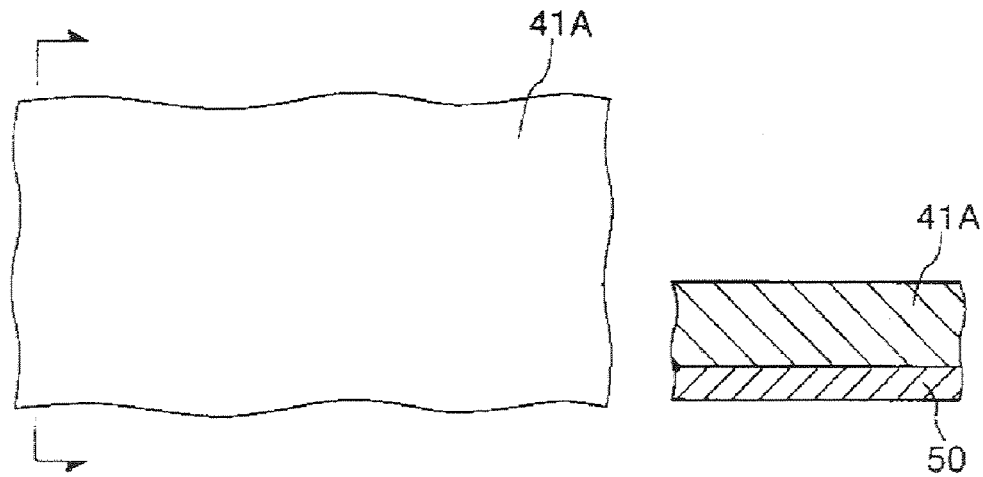
FIGS. 6A and 6B are diagrams for explaining a method for manufacturing the active matrix device shown in FIGS. 1 and 2.
Figure 6B:
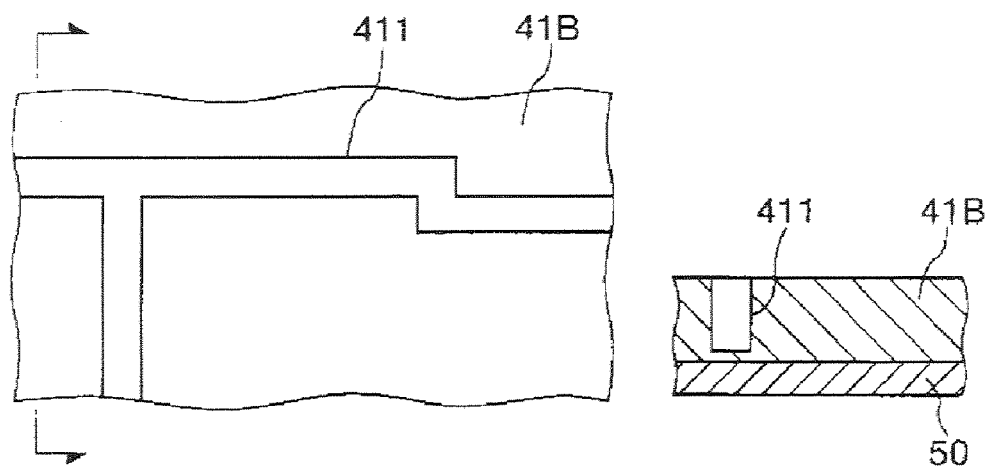
Figure 7A:
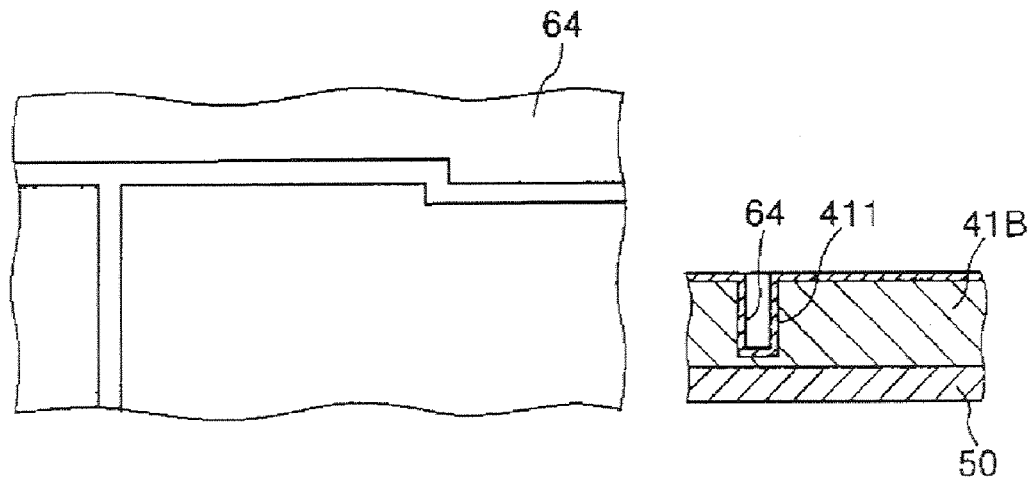
FIGS. 7A and 7B are diagrams for explaining the method for manufacturing the active matrix device shown in FIGS. 1 and 2.
Figure 7B:
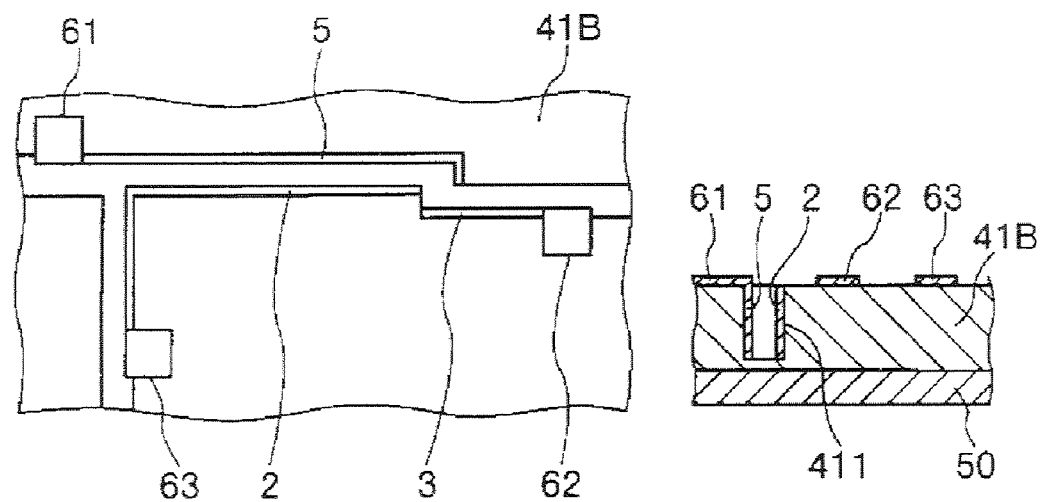
Figure 8A:
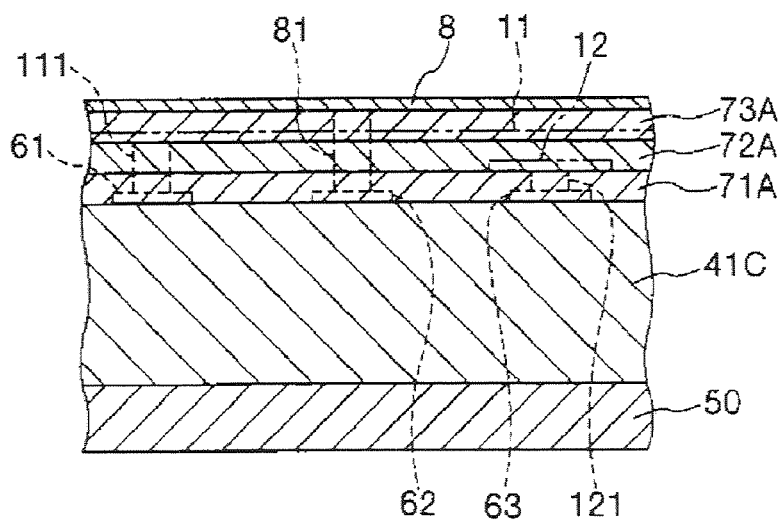
FIGS. 8A through 8C are diagrams for explaining the method for manufacturing the active matrix device shown in FIGS. 1 and 2.
Figure 8B:
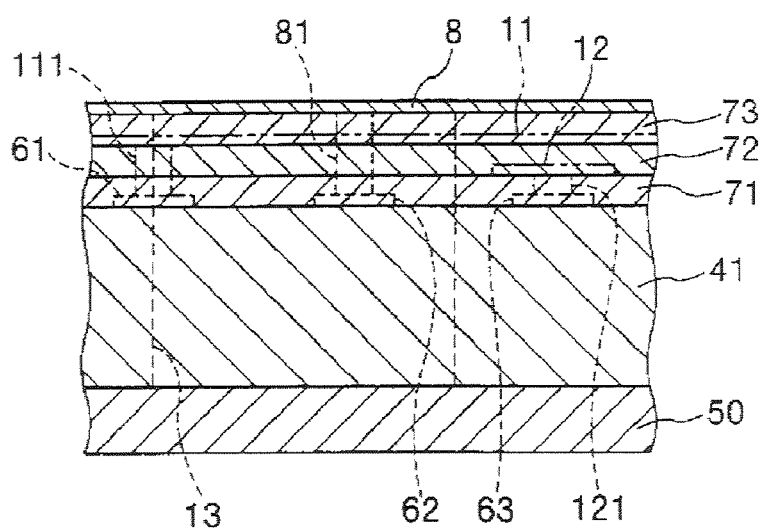
Figure 8C:
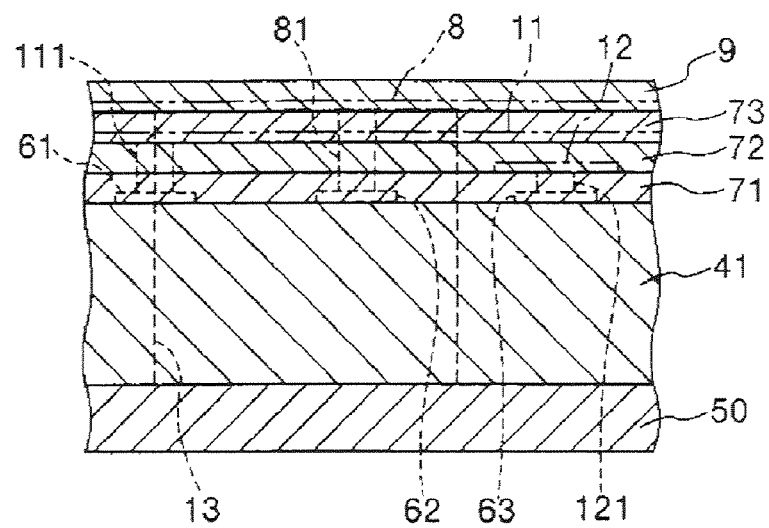

FIGS. 6A through 8C are diagrams for explaining the method for manufacturing the active matrix device (method for manufacturing each switching element) shown in FIGS. 1 and 2. In each of FIGS. 6A through 7B, a diagram in the left side shows a plan view corresponding to FIG. 3, while a diagram in the right side shows a sectional view corresponding to FIG. 2. FIGS. 8A to 8C are sectional views corresponding to FIG. 2. In the following description, for expository convenience, in diagrams in the right side of FIGS. 6A to 7B and in FIGS. 8A to 8C, the top side, the bottom side, the right side, and the left side are described as "top," "bottom," "right," and "left" respectively.

The method for manufacturing the active matrix device 10 includes: [A] forming a first insulating film to be the first insulating layer 41 on the substrate 50; [B] forming the driving electrode 2, the fixed electrode 3, the movable electrode 5, the terminals 61, 62, and 63; [C] sequentially forming a second insulating film, the second wiring lines 12, a third insulating film, the first wiring lines 11, a fourth insulating film, and the pixel electrode 8 in this order; [D] forming the housing portion 13; and [E] forming the sealing layer 9.

Now, each of the steps will be sequentially explained in detail.

[A]

First, the substrate 50 is prepared, and then a first insulating film 41A is formed on the substrate 50 as shown in FIG. 6A.

The first insulating film 41A is to be the first insulating layer 41 in step [D] described later.

For example, when the first insulating film 41A is made of an organic insulating material, the first insulating film 41A is formed by applying (or providing) the organic insulating material or a solution containing its precursor to the substrate 50, and then performing necessary post treatment thereto (e.g. heating, irradiation of infrared rays, application of ultrasonic waves).

The organic insulating material or the solution containing its precursor can be applied (or provided) to the surface of the substrate 50 by employing a coating method, a printing method, or the like.

Further, when the first insulating film 41A is made of an inorganic material, the first insulating film 41A can be formed by employing thermal oxidation, chemical vapor deposition (CVD), spin-on glass (SOG), or the like. Furthermore, by using polysilazane as a material, a silica film or a silicon nitride film is possibly formed as the first insulating film 41A through wet processing.

[B]

-B1-

As shown in FIG. 6B, a groove 411 is formed in the first insulating film 41A. A first insulating film 41B is thus obtained.

Here, the groove 411 is formed to have a depth in which the bottom of the groove 411 does not reach the substrate 50.

The groove 411 has a cross-sectional shape (quadrangle) having a side surface orthogonal to the surface of the substrate 50. The side surface is for a surface on which each of the electrodes 2, 3, and 5 of the switching elements 1 is formed as described later.

The method for forming the groove 411 (method for removing a part of the first insulating film 41A) is not particularly limited, therefore, one or more than one in combination of the following exemplary methods can be employed; physical etching such as plasma etching, reactive ion etching, beam etching, and photo assist etching; and chemical etching such as wet etching.

Here, a resist layer having an opening in a shape corresponding to the shape of the groove 411 is formed on the first insulating film 41A by photolithography. The resist layer is used as a mask to remove an unnecessary portion of the first insulating film 41A.

Then, the resist layer is removed, providing the groove 411.

The driving electrode 2, the fixed electrode 3, and the like may also be formed by providing a liquid material such as a colloidal liquid (dispersion liquid) containing conductive particles, a liquid (solution or dispersion liquid) containing conductive polymer, or the like on the substrate 50 so as to form a coating film and followed by post treatment (for example, heating, infrared ray irradiation, and ultrasonic wave application) as necessary.

-B2-

Next, as shown in FIG. 7A, a conductive film 64 is formed on the first insulating film 41B.

The conductive film 64 forms the electrodes 2, 3, and 5 and the terminals 61, 62, and 63 of the switching elements 1.

Therefore, to form the conductive film 64, the constituent material of the electrodes 2, 3, and 5 of the switching elements 1 can be employed.

Further, the method for forming the conductive film 64 is not particularly limited, and thus the following methods can be employed: CVD including plasma CVD, thermal CVD, and laser CVD; vacuum deposition; sputtering (low-temperature sputtering); dry plating such as ion plating; wet plating including electrolytic plating, immersion plating, and electroless plating; spraying; sol-gel processing; a metal organic deposition (MOD) method; and thin film bonding.

When silicon is used as a main constituent of the conductive film 64, amorphous silicon ($\alpha$-Si) material or silicon and carbide can be formed by CVD.

-B3-

Then, as shown in FIG. 7B, a part (unnecessary part) of the conductive film 64 is removed. The driving electrode 2, the fixed electrode 3, the movable electrode 5, and the terminals 61, 62, and 63 are thus obtained.

The method for removing the part of the conductive film 64 is not particularly limited, and thus the same method as step B1 described above can be employed.

[C]

Next, as shown in FIG. 8A, a second insulating film 71A, the second wiring lines 12, a third insulating film 72A, the first wiring lines 11, a fourth insulating film 73A, and the pixel electrodes 8 are formed in this order. Here, when the second insulating film 71A is formed, the groove 411 in the first insulating film 41B is filled, thus providing a first insulating film 41C.

Here, the second insulating film 71A is to be the second insulating layer 71, and the third insulating layer 72A is to be the third insulating layer 72, while the fourth insulating film 73A is to be the fourth insulating layer 73.

Each method for forming the second wiring lines 12, the first wiring lines 11, and the pixel electrodes 8 is not particularly limited, and thus the same methods as step A and step B1 described above can be employed.

In a case where silicon is used as a main constituent material of the conductive film 64 in step B2 described above, and Al is used to form the first wiring lines 11 and a conductive layer 6 as the main constituent, it is preferable to use Al—Si alloy (Si content of 2%).

Further, each method for forming the second insulating film 71A, the third insulating film 72A, and the fourth insulating film 73A can employ the same method as step [A] described above.

[D]

Next, as shown in FIG. 8B, the first insulating film 41C, the second insulating film 71A, the third insulating film 72A, and the fourth insulating film 73A are wet-etched through the through hole (not illustrated) formed in the pixel electrode 8 so as to form the housing portion 13. The first insulating layer 41, the second insulating layer 71, the third insulating layer 72, and the fourth insulating layer 73 are thus obtained.

More specifically, a mask having an opening to expose the through hole (not illustrated) in the pixel electrode 8 is formed on the pixel electrode 8, and followed by wet etching through the mask so as to remove a part of each of the first insulating film 41C, the second insulating film 71A, the third insulating film 72A, and the fourth insulating film 73A, thereby forming the first insulating layer 41, the second insulating layer 71, the third insulating layer 72, and the fourth insulating layer 73. Accordingly, the housing portion 13 for accommodating the driving electrode 2, the fixed electrode 3, and the movable electrode 3 is formed.

Thereafter, the mask is removed.

[E]

Next, as shown in FIG. 8C, the sealing layer 9 is formed so as to cover the plurality of pixel electrodes 8. Consequently, the active matrix device 10 (switching elements 1) is obtained.

Through the steps described above, the active matrix substrate 10 can be achieved.

[Second Embodiment]

A second embodiment of the invention will now be described.

Figure 9A:
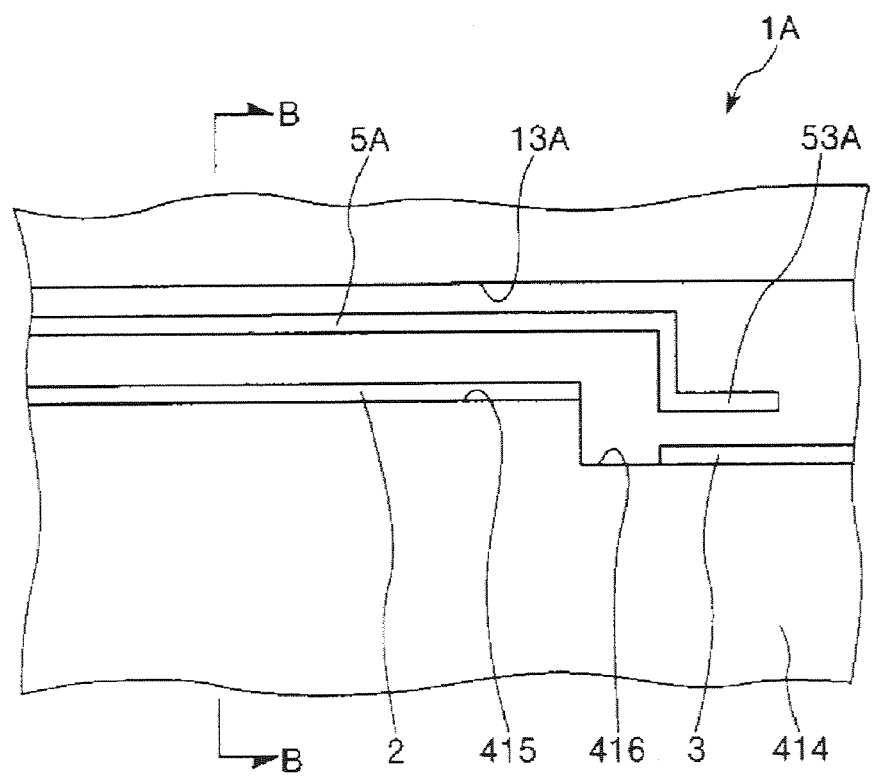
FIGS. 9A and 9B are diagrams showing a schematic configuration of a switching element included in an active matrix device according to a second embodiment of the invention.
Figure 9B:
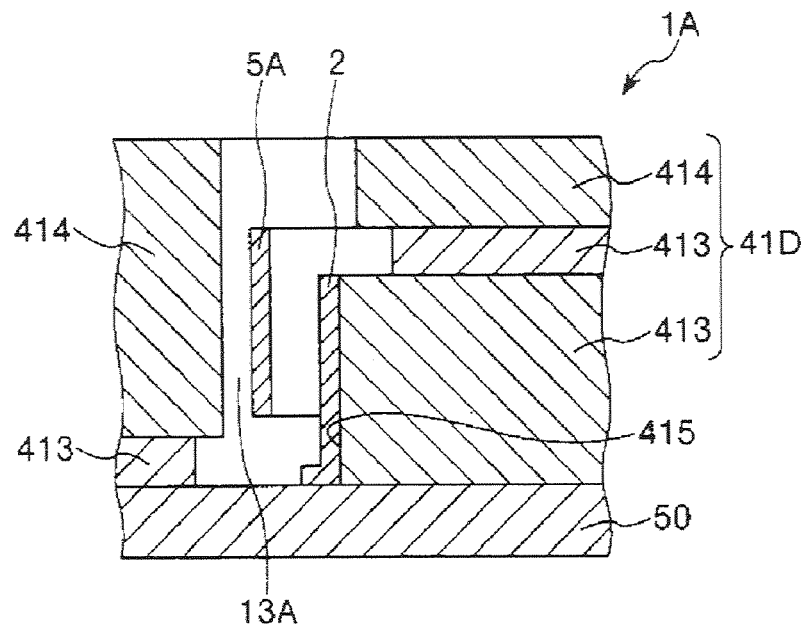

FIGS. 9A and 9B are diagrams schematically showing a configuration of a switching element included in an active matrix device according to a second embodiment of the invention. FIGS. 10A through 12B are diagrams for explaining a method for manufacturing the switching element shown in FIGS. 9A and 9B, while the FIG. 13 is a diagram showing an inverter circuit that is an example for applications of the switching element shown in FIGS. 9A and 9B. FIG. 9A is a plan view showing the switching element according to the second embodiment of the invention, while FIG. 9B is a sectional view taken along a line B-B in FIG. 9A. Further, FIGS. 10A through 12B respectively show sectional views corresponding to FIG. 9B.

In the description of the second embodiment below, differences from the first embodiment will be mainly explained, and the same contents of them are omitted. Further, in FIGS. 9A and 9B, the same numeral is given to the same structure in the first embodiment described above.

The switching element in the second embodiment is similar to the switching element in the first embodiment except for the manufacturing method and the configuration in accordance with the method.

A switching element 1A shown in FIGS. 9A and 9B includes the driving electrode 2, the fixed electrode 3, and a movable electrode 5A that are formed on one of the surfaces of the substrate 50.

A major portion of the switching element 1A (i.e. a major portion of each of the driving electrode 2, the fixed electrode 3, and the movable electrode 5A) is accommodated in a housing portion 13A formed on the substrate 50. The housing portion 13A is formed so as to penetrate through an insulating layer 41D formed on the substrate 50 in the thickness direction of the substrate 50.

The insulating layer 41D includes a first layer 412, a second layer 413, and a third layer 414.

The first layer 412 has a wall surface 415 that is perpendicular to the surface of the substrate 50. On the wall surface 415, the driving electrode 2 is formed. Further, the first layer 412 has a wall surface 416 that is perpendicular to the surface of the substrate 50 and parallel to the wall surface 416. On the wall surface 416, the fixed electrode 3 is formed. The first layer 412, the second layer 413, and the third layer 414 will be described in detail in description of the manufacturing method later.

The movable electrode 5A is formed so as to face the driving electrode 2 and the fixed electrode 3.

The movable electrode 5A has an elongated shape (i.e. strip), and one end (end in the left side in FIG. 9A) in the longitudinal direction is fixed, thus being cantilever-supported. The movable electrode 5A has a free end that can be displaced toward the driving electrode 2 and the fixed electrode 3 (i.e. the bottom side).

Further, a portion of the movable electrode 5A facing the fixed electrode 3, that is, an end portion of the movable electrode 5A has a flat surface 53A that is nearly parallel to an electrode surface of the fixed electrode 3. The movable electrode 5A having the flat surface 53A formed thereon as above can secure a larger contact area of the movable electrode 5A and the fixed electrode 3 when the movable electrode 5A comes in contact with the fixed electrode 3. The movable electrode 5A thus can securely be in contact with the fixed electrode 3 when it is desired, thereby improving reliability of the switching element 1A.

The method for manufacturing the switching element 1A structured as above will now be described. In the following description, the method for manufacturing the switching element 1A will be described as an example of methods for manufacturing the switching element.

The method for manufacturing the switching element 1A includes: [1] forming a step portion on the substrate 50; [2] forming a first electrode on a wall surface of the step portion; [3] forming an insulating layer so as to cover the first electrode; [4] forming a second electrode on the insulating layer; [5] removing a part of the insulating layer. The first electrode serves as a driving electrode, while the second electrode serves as a movable electrode.

Each of steps [1] to [5] will be sequentially explained in detail below.

[1]

Figure 10A:
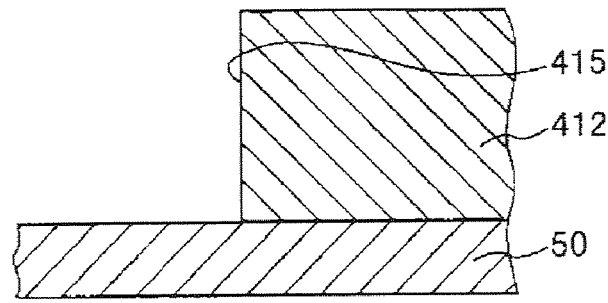
FIGS. 10A through 10C are diagrams for explaining a method for manufacturing the switching element shown in FIGS. 9A and 9B.

First, as shown in FIG. 10A, the first layer 412 is formed on the substrate 50. A step portion having the wall surface 415 perpendicular to the surface of the substrate 50 is thus formed on one of the surfaces of the substrate 50.

The first layer 412 is formed by forming an insulating film and removing a part of the insulating film. A method for forming the insulating film can employ a similar method to the method for forming the first insulating film 41A that is step [A] in the method for manufacturing the switching element 1 according to the first embodiment described above. Further, as a method for removing a part of the insulating film, the same method as the method for forming the groove 411 that is step B1 in the method for manufacturing the switching element 1 according to the first embodiment can be employed.

[2]

2-1

Figure 10B:
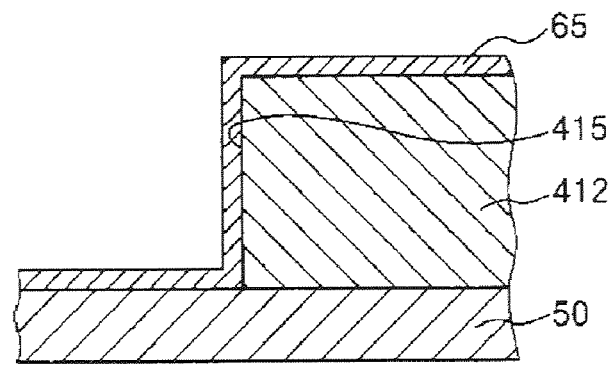

Subsequently, as shown in FIG. 10B, a first electrode layer 65 is formed so as to cover the first layer 412.

Here, the first electrode layer 65 is formed so as to cover the wall surfaces 415 and 416.

A method for forming the first electrode layer 65 can employ the same method as the method for forming the conductive film 64 that is step [B2] in the method for manufacturing the switching element 1 according to the first embodiment described above.

2-2

Figure 10C:
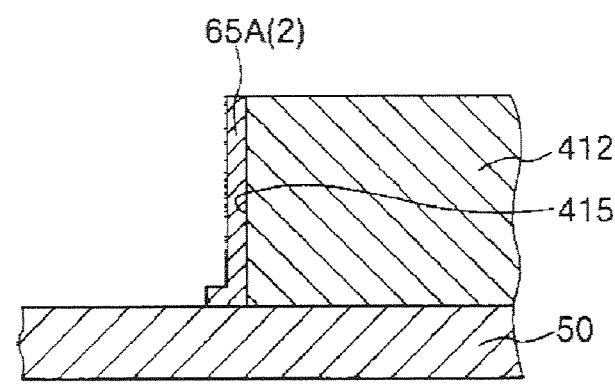

Thereafter, as shown in FIG. 10C, a part of the first electrode layer 65 is removed (patterned), thereby providing the first electrode 65A.

The first electrode 65A is formed in the same shape and the same size as those of the driving electrode 2. That is, the driving electrode 2 is formed in this step. Further, in this step, although it is not illustrated, the fixed electrode 3 is also formed by patterning the first electrode layer 65.

A method for removing a part of the first electrode layer 65 can employ the same method as the method for removing a part of the conductive film 64 that is step [B3] in the method for manufacturing the switching element 1 according to the first embodiment described above. In particular, isotropic etching is preferably employed.

The first electrode 65A is thus formed on the wall surface 415.

[3]

Figure 11A:
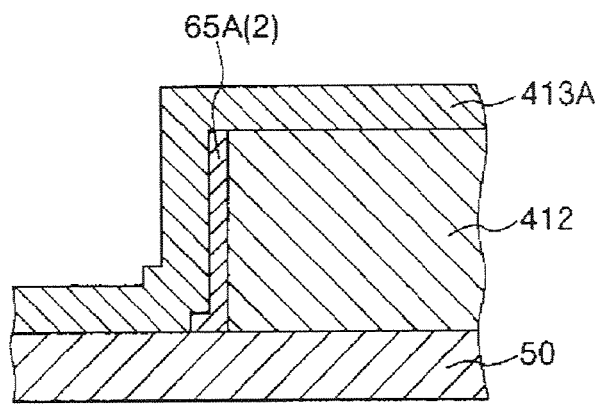
FIGS. 11A through 11C are diagrams for explaining the method for manufacturing the switching element shown in FIGS. 9A and 9B.

Then, as shown in FIG. 11A, an insulating layer 413A having an insulating property is formed so as to cover the first electrode 65A.

The insulating layer 413A has a part to be removed in step [5] (i.e. sacrificial layer), resulting in forming the second layer 413 described above.

A method for forming the insulating layer 413A can employ the same method as the method for forming the first insulating film 41A that is step [A] in the method for manufacturing the switching element 1 according to the first embodiment described above.

Further, the thickness of the insulating layer 413A corresponds to a distance between the driving electrode 2 and the movable electrode 5A (i.e. an electrostatic gap). Therefore, the distance between the driving electrode 2 and the movable electrode 5A can be defined by the thickness of the insulating layer 413A after a part of the insulating layer 413A is removed in step [5] described later.

Further, although it is not illustrated, the insulating layer 413A is formed so as to also cover the fixed electrode 3.

In step [3], it is preferable that a film having a resistance property against an etchant used in etching in step [5] (removing a sacrificial layer) described later be formed, and the insulating layer 413A be formed thereon. Therefore, in step [5] described later, the first electrode 65A, the substrate 50, and the like are prevented from being etched.

[4]

4-1

Figure 11B:
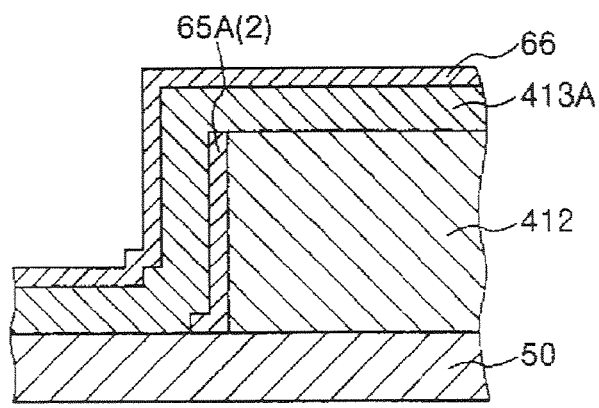

Next, as shown in FIG. 11B, a second electrode layer 66 is formed on the insulating layer 413A.

A method for forming the second electrode layer 66 can employ the same method as the method for forming the conductive film 64 that is step [B2] in the method for manufacturing the switching element 1 according to the first embodiment described above.

4-2

Figure 11C:
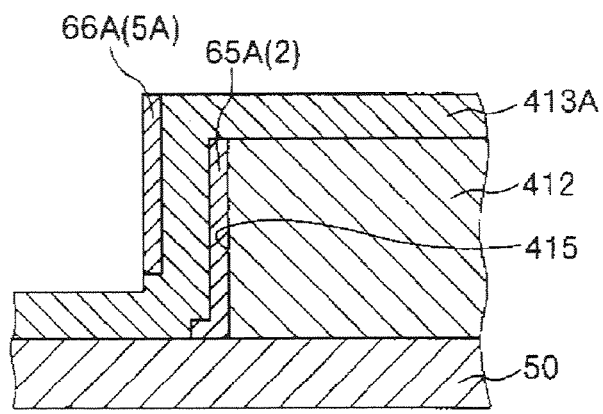

Thereafter, as shown in FIG. 11C, a part of the second electrode layer 66 is removed, thereby providing a second electrode 66A.

A method for removing a part of the second electrode layer 66 can employ the same method as the method for removing a part of the conductive film 64 that is step [B3] in the method for manufacturing the switching element 1 according to the first embodiment described above. In particular, anisotropic etching is preferably employed.

The second electrode 66A is formed in the same shape and the same size as the movable electrode 5A. That is, the movable electrode 5A is formed in this step.

The second electrode 66A (movable electrode 5A) is thus formed on the insulating layer 413A so as to face the first electrode 65A (driving electrode 2) through the insulating layer 413A.

Further, although it is not illustrated, the second electrode 66A is formed so as to also face the fixed electrode 3 through the insulating layer 413A.

[5]

5-1

Figure 12A:
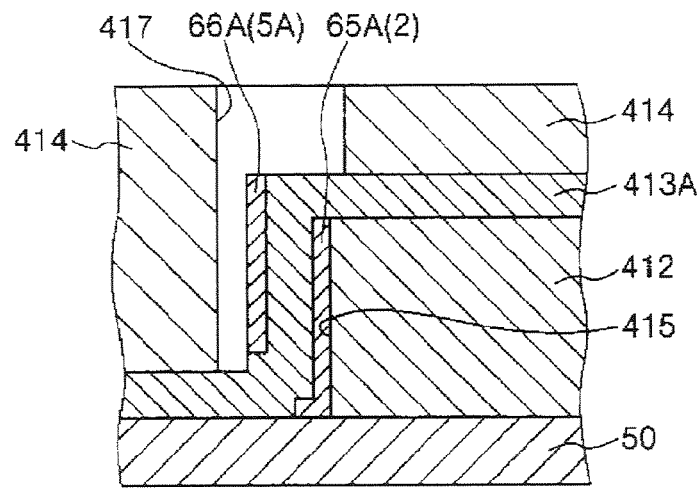
FIGS. 12A and 12B are diagrams for explaining the method for manufacturing the switching element shown in FIGS. 9A and 9B.
Figure 13:
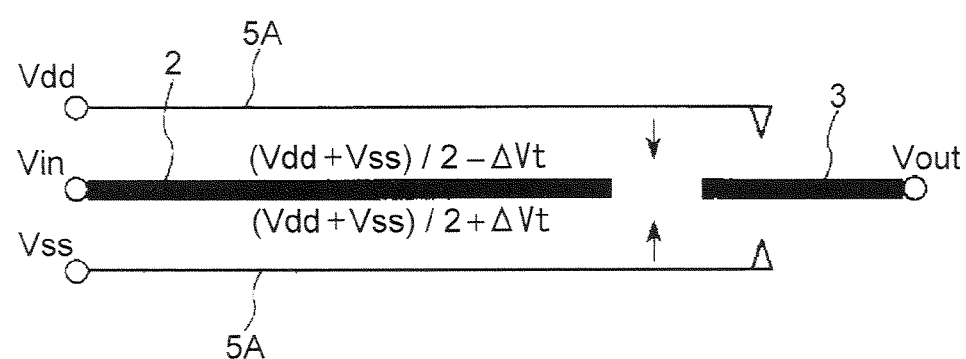
FIG. 13 is a diagram showing an inverter circuit that is an example for applications of the switching element shown in FIGS. 9A and 9B.

Then, the third layer 414 is formed as shown in FIG. 12A.

The third layer 414 is formed by forming an insulating film and removing a part of the insulating film. A method for forming the insulating film can employ a similar method to the method for forming the first insulating film 41A that is step [A] in the method for manufacturing the switching element 1 according to the first embodiment described above. Further, as a method for removing a part of the insulating film, the same method as the method for forming the groove 411 that is step B1 in the method for manufacturing the switching element 1 according to the first embodiment can be employed.

5-2

Figure 12B:
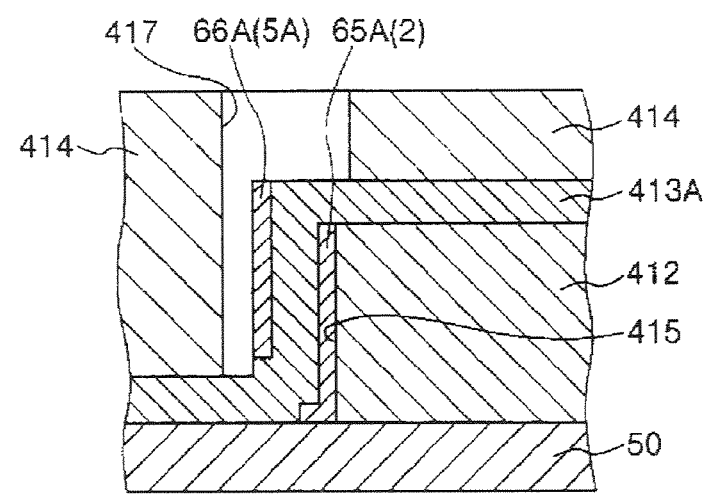

Then, as shown in FIG. 12B, a part of the insulating layer 413A is removed. Here, in the insulating layer 413A, a portion between the first electrode 65A (driving electrode 2) and the second electrode 66A (movable electrode 5A), and a peripheral portion of the second electrode 66A (movable electrode 5A) are removed.

As a result, the second layer 413 is formed, while an electrostatic gap is formed between the first electrode 65A (driving electrode 2) and the second electrode 66A (movable electrode 5A), enabling the second electrode 66A (movable electrode 5A) to be displaced to be in contact with or apart from the first electrode 65A (driving electrode 2).

Further, although it is not shown, in the insulating layer 413A, a portion between the fixed electrode 3 and the second electrode 66A (movable electrode 5A) is also removed.

A method for removing a part of the insulating layer 413A can employ isotropic etching. Further, when a part of the insulating layer 413A is removed, the isotropic etching is performed through an opening 417 of the third layer 414. However, it is preferable to perform anisotropic etching prior to the isotropic etching. That is, it is preferable to perform the anisotropic etching, and the isotropic etching in this order by using the opening 417 of the third layer 414. This can reduce an amount of side etching of the insulating layer 413A (undesired side etching is prevented from occurring).

According to the above, the switching element 1A having the driving electrode 2 and the movable electrode 5A facing to each other through the electrostatic gap, and the movable electrode 5A that can be displaced so as to come in contact with or apart from the driving electrode 2 is achieved.

According to the method for manufacturing the switching element 1A as described above, a size of the distance between the movable electrode 5A and the driving electrode 2 (that is an electrostatic gap) can be defined by the thickness of the insulating layer 413A. Further, the thickness of the insulating layer 413A can be made smaller than a minimum width of a line or a space that can be formed by photolithography. Therefore, the electrostatic gap can be also reduced in size. As a result, a driving voltage of the switching element 1A can be reduced. Further, since a space required for mounting the switching element 1A is small, a freedom in designing the active matrix device using the switching element 1A is enhanced. In addition, the thickness of the insulating layer 413A can be accurately defined compared to dimensional accuracy obtained by a line or a space width that can be formed by photolithography. Therefore, the switching element 1A manufactured as described above can have the movable electrode 5A and the driving electrode 2 whose distance therebetween is accurately defined, thereby achieving stable switching characteristics having less variation in an electrostatic gap for each element.

Further, in the first embodiment, the driving electrode 2 and the movable electrode 5 are formed from the same layer (conductive film 64). Therefore, the distance between the driving electrode 2 and the movable electrode 5 is limited in accordance with a minimum width of a line or a space that can be formed by photolithography, allowing not more than one switching element to be formed in the minimum width. On the other hand, in the method for manufacturing the switching element 1A according to the second embodiment, the distance between the driving electrode 2 and the movable electrode 5 is not limited by the minimum width of a line or a space that can be formed by photolithography, allowing two switching elements to be formed in the minimum width. Therefore, a peripheral circuit or the like that is formed by employing such a switching element can achieve reduction of the designed size.

For example, two of switching elements having the same configuration as that of the switching element 1A above are combined by commonly using the driving electrode 2 and the fixed electrode 3, forming an inverter circuit as shown in FIG. 13. Further, combination of such switching elements can configure other logic circuits. The inverter circuit shown in FIG. 13 outputs Vdd when Vin is (Vdd+Vss)/2−ΔVt, but outputs Vss when Vin is (Vdd+Vss)/2+ΔVt. Such a logic circuit can have extremely high reliability, because a through current (leakage current) generated in a logic circuit configured with a CMOS circuit is not generated as long as ΔVth is (Vdd−Vss)/2 or less.

(Electro-Optical Display Device)

Next, as an example of an electro-optical display device according to the invention, a liquid crystal panel provided with the active matrix device 10 as above will be described.

Figure 14:
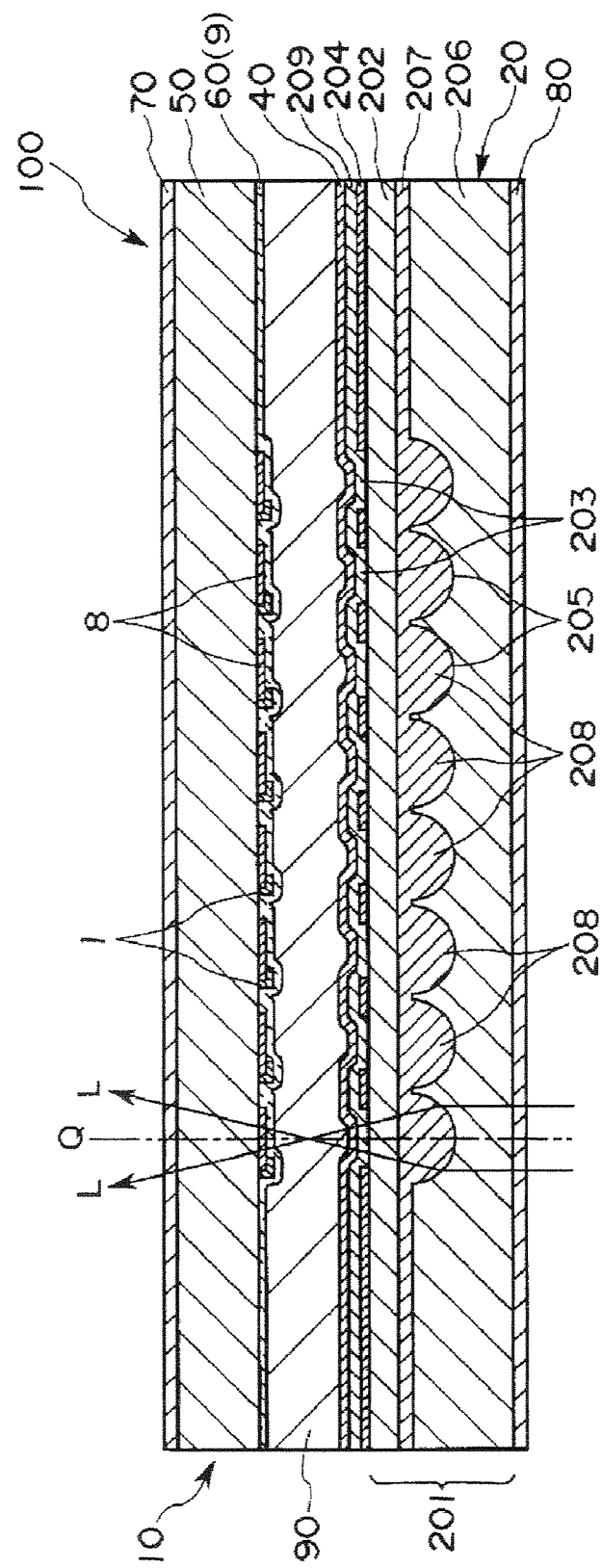
FIG. 14 is a longitudinal sectional view showing a configuration of a liquid crystal panel that is an example of an electro-optical device of the invention.

FIG. 14 is a longitudinal sectional view showing an embodiment in a case of applying the electro-optical display device according to the invention to the liquid crystal panel.

As shown in FIG. 14, the liquid crystal panel 100 that is an electro-optical display device includes the active matrix device 10 described above, an orientation film 60 bonded to the active matrix device 10, a counter substrate 20 for the liquid crystal panel, an orientation film 40 bonded to the counter substrate 20 for the liquid crystal panel, a liquid crystal layer 90 formed of liquid crystal encapsulated in a gap between the orientation films 60 and 40, a polarizing film 70 bonded to an outer front surface (top surface) of the active matrix device 10 (liquid crystal driving device), and a polarizing film 80 bonded to an outer surface (bottom surface) of the counter substrate 20 for the liquid crystal panel.

The counter substrate 20 includes a micro-lens substrate 201, a black matrix 204, and the transparent conductive film (common electrode) 209. The black matrix 204 is formed on a surface layer 202 of the micro-lens substrate 201 and includes an opening 203 formed therein. The transparent conductive film 209 is formed on the surface layer 202 so as to cover the black matrix 204.

The micro-lens substrate 201 includes a substrate (first substrate) 206 with recess portions for the microlens having a plurality (a large number) of recess portions (recess portions for microlens) 205 with a concave curved surface, and the surface layer 202 bonded to a surface on which the recess portions 205 of the substrate 206 are formed via a resin layer (adhesive layer) 207. Further, the resin layer 207 includes microlens 208 made of resin filling the recess portions 205.

Here, the active matrix device 10 is a device to operate liquid crystal in the liquid crystal layer 90.

The switching element 1 in the active matrix device 10 is coupled to a control circuit that is not illustrated and controls an electric current supplied to the pixel electrode 8. This controls charge and discharge of the pixel electrode 8.

The orientation film 60 is bonded to the pixel electrode 8 of the active matrix device 10, while the orientation film 40 is bonded to the liquid crystal layer 90 of the counter substrate 20 for the liquid crystal panel. Here, the orientation film 60 concurrently serves as the sealing layer 9 of the active matrix device 10 described above.

Each of the orientation films 40 and 60 has a function to control an orientation state (when no voltages are applied) of liquid crystal molecules constituting the liquid crystal layer 90.

A material of the orientation films 40 and 60 is not particularly limited, but typically, high polymer materials such as polyimide resin, polyamideimide resin, polyvinyl alcohol, polytetrafluoroethylene and the like is mainly used. Among such high polymer materials, polyimide resin and polyamideimide resin are particularly preferable. If the orientation films 40 and 60 are mainly made of polyimide resin and polyamideimide resin, high polymer films are simply and easily formed in a manufacturing step, and characteristics superior in heat resistance, chemical resistance and the like are provided.

Further, as the orientation films 40 and 60, films made of the material described above and treated so as to have an orientating function to control an orientation of the liquid crystal molecules constituting the liquid crystal layer 90 are typically used. Examples of a method for providing an orienting function are rubbing, photo-alignment method, and the like.

The average thickness of the orientation film as above is preferably from about 20 nm to about 120 nm, and more preferably from about 30 nm to about 80 nm.

The liquid crystal layer 90 contains liquid crystal molecules. The liquid crystal molecules, that is, orientation of liquid crystal changes corresponding to charge and discharge of the pixel electrode 8.

As the liquid crystal molecules, any liquid crystal molecules such as nematic liquid crystal, smectic liquid crystal or the like can be used as long as they can be oriented. However, for TN type liquid crystal panels, it is preferable to use one forming nematic liquid crystal such as phenylcyclohexane-derivative liquid crystal, biphenyl-derivative liquid crystal, biphenylcyclohexane-derivative liquid crystal, terphenyl-derivative liquid crystal, phenylether-derivative liquid crystal, phenylester-derivative liquid crystal, bicyclohexane-derivative liquid crystal, azomethine-derivative liquid crystal, azoxy-derivative liquid crystal, pyrimidine-derivative liquid crystal, dioxane-derivative liquid crystal, and cubane-derivative liquid crystal, for example. Further, this includes the liquid crystal molecules having fluorinated substituents such as a monofluoro group, a difluoro group, a trifluoro group, a trifluoromethyle group, and a difluoromethoxy group, being introduced into nematic liquid crystal molecules.

In the liquid crystal panel 100 as above, one of the micro lenses 208, one of the opening 203 in the black matrix 204 corresponding to an optical axis Q of the microlens 208, and one of the switching elements 1 coupled to the pixel electrode 8 are typically corresponded to one pixel.

Incident light L entered from a counter substrate 20 side passes through the substrate 206, and then passes through the resin layer 207, the surface layer 202, the opening 203 of the black matrix 204, the transparent conductive film 209, the liquid crystal layer 90, the pixel electrode 8, and the substrate 50 while being collected when passing through the microlens 208. Here, since the polarizing film 80 is formed in an incident light side of the microlens substrate 201, the incident light L becomes linearly polarized light when passing through the liquid crystal layer 90. At that time, a polarization direction of the incident light L is controlled corresponding to the orientation state of the liquid crystal molecules of the liquid crystal layer 90. Therefore, luminance of output light is controlled by allowing the incident light L having passed through the liquid crystal panel 100 to pass through the polarizing film 70.

The liquid crystal panel 100 includes the microlens 208 as described above, and further, the incident light L having passed through the microlens 208 is collected and passes through the opening 203 of the black matrix 204. On the other hand, the incident light L is shielded in a portion in which the opening 203 of the black matrix 204 is not formed. Therefore, in the liquid crystal panel 100, light is prevented from unnecessarily leaking from a portion other than the pixel, and further the incident light L is prevented from attenuating in the pixel portion. Therefore, the liquid crystal panel 100 can have high optical transmittance at the pixel portion.

The liquid crystal panel 100 provided with the active matrix device 10 as described above can thus display a high quality image while having excellent reliability.

The electro-optical display device according to the invention is not limited to be applied to such liquid crystal panels, but can also be applied to electrophoretic displays, organic or inorganic EL displays and so on.

[Electronic Apparatus]

As examples of the electronic apparatus according to the invention, electronic apparatuses provided with the liquid crystal panel 100 described above will now be described based on first to fourth examples shown in FIGS. 15 through 18.

FIRST EXAMPLE

Figure 15:
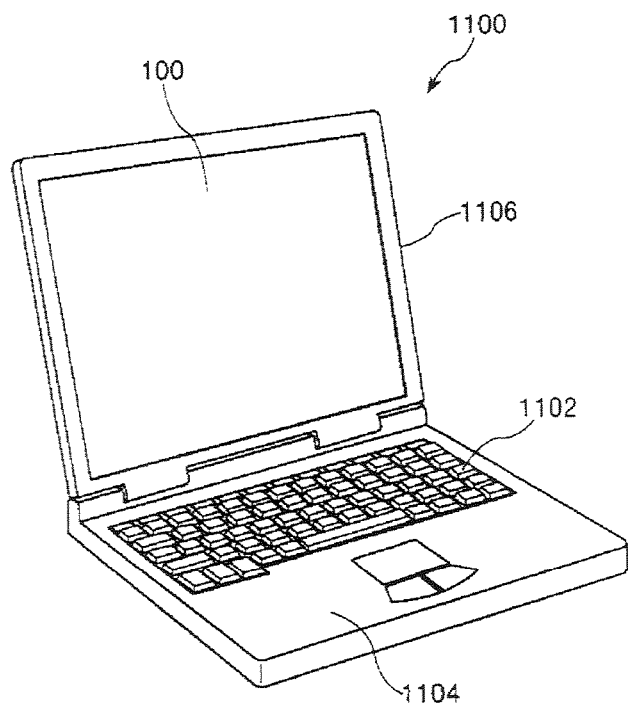
FIG. 15 is a perspective view showing a configuration of a mobile type (or notebook type) personal computer that is a first example of an electronic apparatus of the invention.

FIG. 15 is a perspective view showing a mobile type (or notebook type) personal computer that is a first example of the electronic apparatus.

Referring to this drawing, this personal computer 1100 includes a body 1104 having a keyboard 1102, and a display unit 1106. The display unit 1106 is supported rotatably to the body 1104 with a hinge structure.

In the personal computer 1100, the display unit 1106 includes the liquid crystal panel 100 described above and a backlight (not illustrated). The display unit 1106 displays images (information) by allowing light from the backlight to pass through the liquid crystal panel 100.

SECOND EXAMPLE

Figure 16:
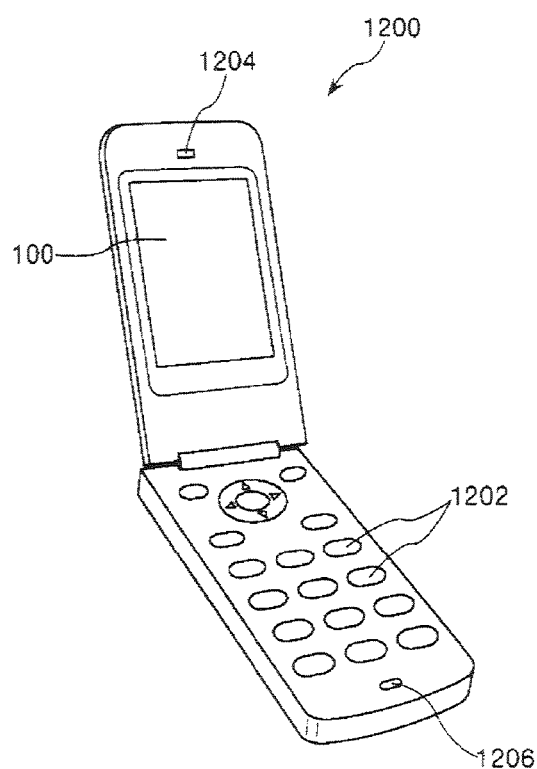
FIG. 16 is a perspective view showing a configuration of a mobile phone (including PHS) that is a second example of the electronic apparatus of the invention.

FIG. 16 is a perspective view showing a mobile phone (including PHS) that is a second example of the electronic apparatus.

Referring to this drawing, a mobile phone 1200 includes the liquid crystal panel 100 and a backlight (not illustrated) in addition to a plurality of operation buttons 1202, an earpiece 1204, and a mouthpiece 1206.

THIRD EXAMPLE

Figure 17:
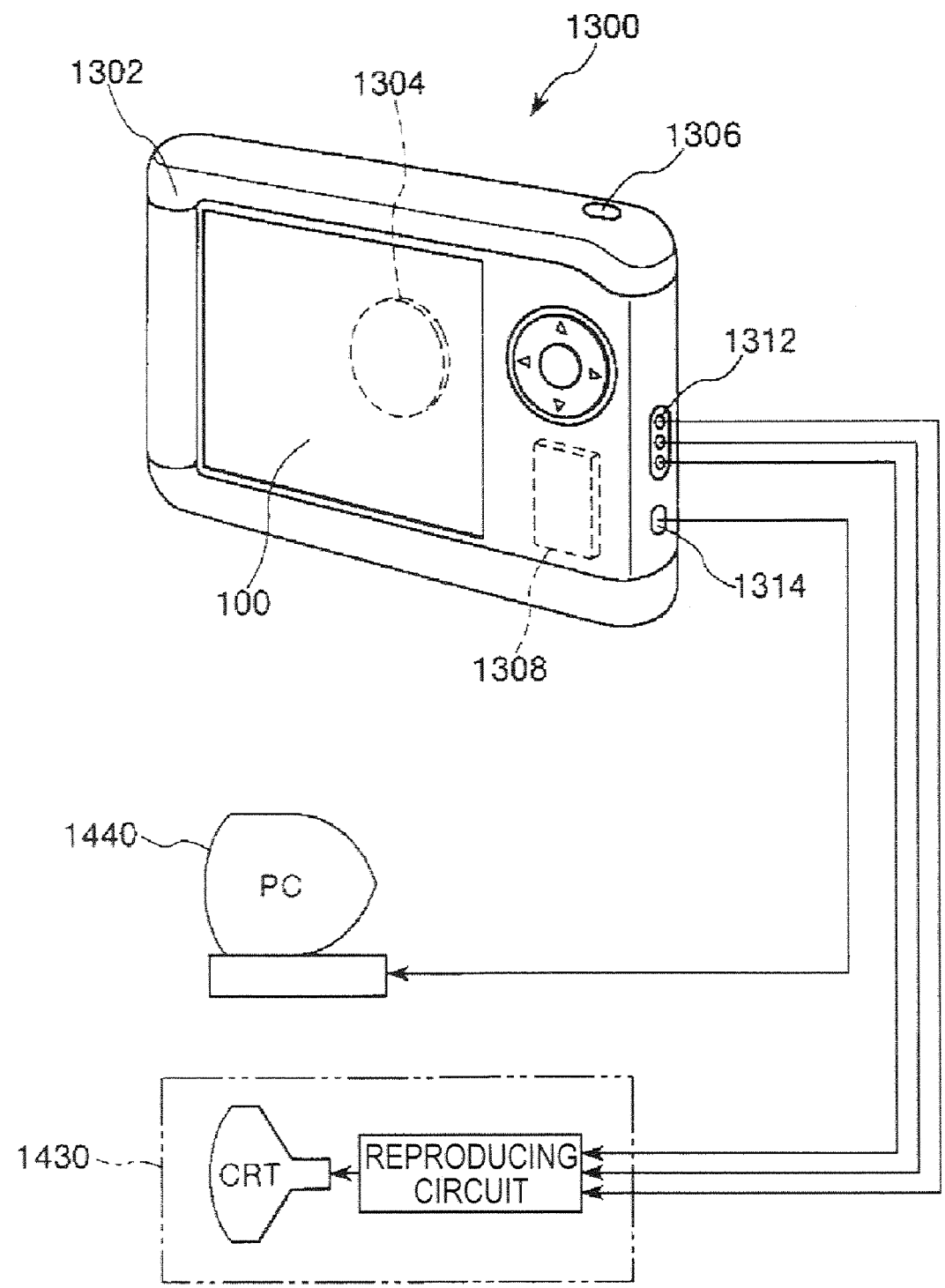
FIG. 17 is a perspective view showing a configuration of a digital still camera that is a third example of the electronic apparatus of the invention.

FIG. 17 is a perspective view showing a digital still camera that is a third example of the electronic apparatus. Here, this drawing simply shows a connection to outer apparatuses.

Here, a digital still camera 1300 is provided with an image sensing device such as a charge coupled device (CCD) that photoelectric-converts an light image of an object into electrical signals and generates an image signal, though a conventional camera uses silver halide photosensitive film that is exposed to a light image of an object.

The digital still camera 1300 includes the liquid crystal panel 100 and a backlight (not illustrated) mounted on the back side of a case (body) 1302 so as to provide a display based on an image signal from the CCD. The liquid crystal panel 100 functions as a finder to display a photographic subject as an electronic image.

A circuit substrate 1308 is installed inside the case. The circuit substrate 1308 is provided with a memory capable of storing (memorizing) an image signal.

On the front side of the case 1302 (the back side in the drawing), a light receiving unit 1304 including an optical lens (imaging optical system), the CCD and the like is disposed.

When a photographer views an image of a photographic object displayed on the liquid crystal panel 100 and presses a shutter button 1306, an image signal in the CCD at the moment is transferred to and stored in the memory of the circuit board 1308.

Further, the digital still camera 1300 is provided with a video signal output terminal 1312 and an input/output terminal 1314 for data communications on the side surface of the case 1302. Then, as illustrated, a television monitor 1430 is coupled to the video signal output terminal 1312, and a personal computer 1440 is coupled to the input/output terminal 1314 for data communications, respectively, as required. Further, an image signal stored in the memory of the circuit board 1308 is outputted to the TV monitor 1430 and the personal computer 1440 in accordance with a predetermined operation.

FOURTH EXAMPLE

Figure 18:
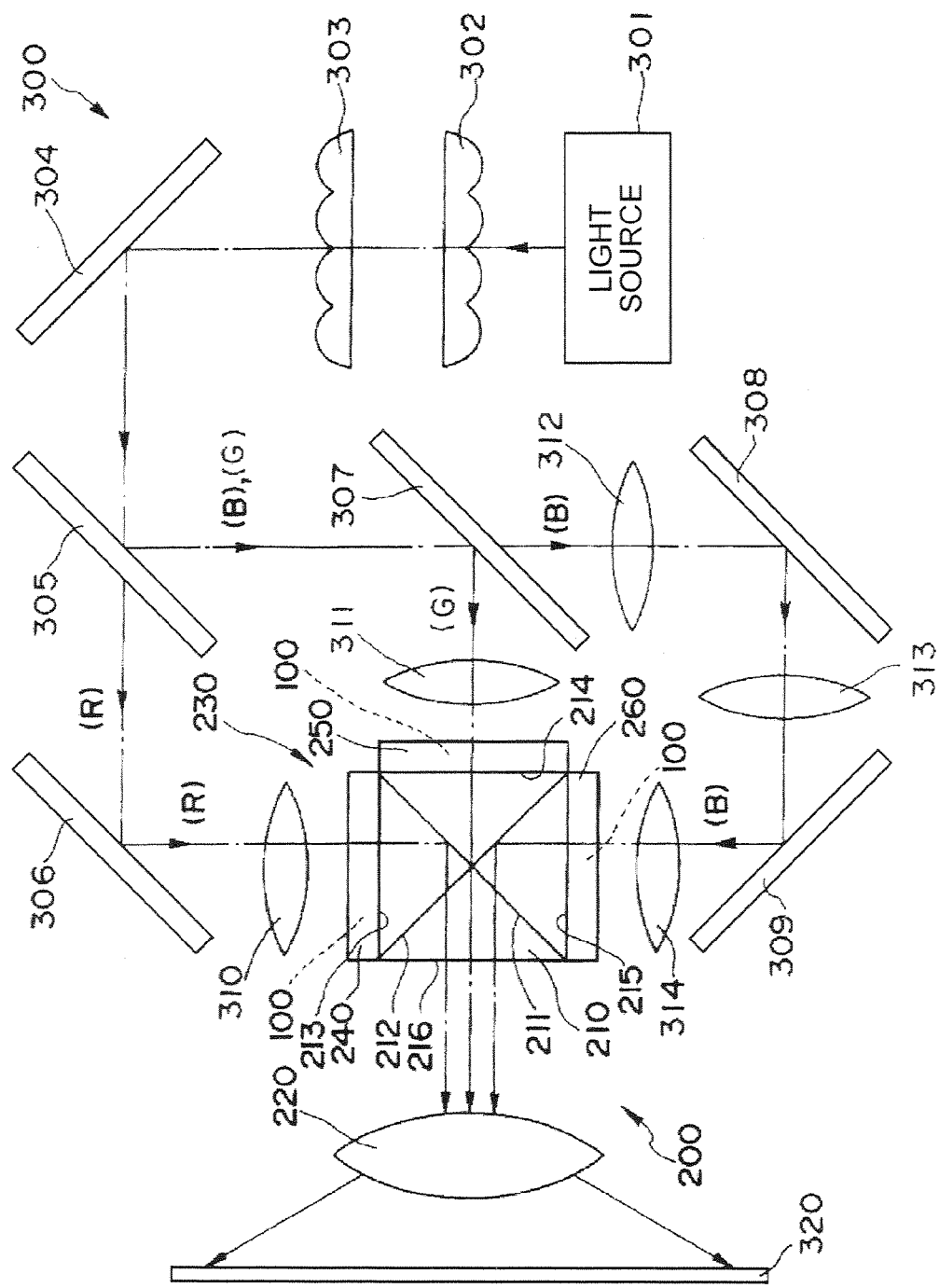
FIG. 18 is a schematic view showing an optical system of a projection display device that is a fourth example of the electronic apparatus of the invention.

FIG. 18 is a schematic view showing an optical system of a projection display device (liquid crystal projector) that is a fourth example of the electronic apparatus of the invention.

As shown in FIG. 18, a projection display device 300 includes: a light source 301; a lighting optical system provided with a plurality of integrator lenses; a color separation optical system (light guide optical system) provided with a plurality of dichroic mirrors; a liquid crystal light valve (liquid crystal shutter array) 240 (for red) corresponding to a red color; a liquid crystal light valve (liquid crystal shutter array) 250 (for green) corresponding to a green color; a liquid crystal light valve (liquid crystal shutter array) 260 (for blue) corresponding to a blue color; a dichroic prism (color combining optical system) 210 having a dichroic mirror surface 211 reflecting red light only and a dichroic mirror surface 212 reflecting blue light only formed thereon; and a projection lens (projection optical system) 220.

Further, the lighting optical system includes integrator lenses 302 and 303. The color separation optical system includes: mirrors 304, 306, and 309; a dichroic mirror 305 reflecting blue light and green light (allowing only red light to pass through); a dichroic mirror 307 reflecting green light only; a dichroic mirror 308 reflecting blue light only (or a mirror reflecting blue light); a condenser lenses 310, 311, 312, 313, and 314.

The liquid crystal light valve 250 is provided with the liquid crystal panel 100 described above. The liquid crystal light valves 240 and 260 also have the same structure as the liquid crystal light valve 250. The liquid crystal panel 100 included in the liquid crystal light valves 240, 250, and 260 as above is coupled to a driving circuit (not illustrated).

In the projection display device 300, the dichroic prism 210 and the projection lens 220 constitute an optical block 200. The liquid crystal light valves 240, 250, and 260 that are securely mounted to the optical block 200 and the dichroic prism 210 constitute a display unit 230.

An operation of the projection display device 300 will now be described.

White light (white light beam) outputted from the light source 301 passes through the integrator lenses 302 and 303. Light intensity (luminance distribution) of the white light is uniformalized by the integrator lenses 302 and 303. The white light outputted from the light source 301 preferably has a relatively large light intensity. This enables images formed on a screen 320 to display more clearly. Further, the projection display device 300 employs the liquid crystal panel 100 that is superior in light resistance, thereby providing excellent stability for a long period of time even if the light intensity of the light outputted from the light source 301 is large.

The white light having passed through the integrator lenses 302 and 303 is reflected toward the left in FIG. 18 by the mirror 304. A blue light component (B) and a green light component (G) in the reflected light are respectively reflected toward the bottom side in FIG. 18 by the dichroic mirror 305, while a red light component (R) passes through the dichroic mirror 305.

The red light component having passed through the dichroic mirror 305 is reflected toward the bottom side in FIG. 18 by the mirror 306. The reflected light is shaped by the condenser lens 310 and enters the liquid crystal light valve 240 for red.

The green light component between the blue light component and the green light component having been reflected by the dichroic mirror 305 is reflected toward the left side in FIG. 18 by the dichroic mirror 307, while the blue light component passes through the dichroic mirror 307.

The green light component reflected by the dichroic mirror 307 is shaped by the condenser lens 311 and enters the liquid crystal light valve 250 for green.

Further, the blue light component having passed through the dichroic mirror 307 is reflected toward the left side in FIG. 18 by the dichroic mirror (or the mirror) 308. Then, the reflected light is reflected toward the top in FIG. 18 by the mirror 309. The blue light component is shaped by the condenser lens 312, 313, and 314, and enters the liquid crystal light valve 260 for blue.

Accordingly, the white light outputted from the light source 301 is color-separated into three primary colors that are red, green, and blue by the color separation optical system, and are respectively guided to enter corresponding liquid crystal light valves.

Here, each pixel (the switching element 1 and the pixel electrode 8 coupled thereto) of the liquid crystal panel 100 included in the liquid crystal light valve 240 is subjected to a switching control (ON/OFF), that is, modulated by the driving circuit (driving unit) that operates based on an image signal for red.

Similarly, the green light component and the blue light component respectively enter the liquid crystal light valves 250 and 260 and are modulated by the liquid crystal panels 100 respectively corresponding to the green light component and the blue light component. This can form an image for green and an image for blue. Here, each pixel of the liquid crystal panel 100 included in the liquid crystal light valve 250 is subjected to a switching control by the driving circuit that operates based on an image signal for green, while each pixel of the liquid crystal panel 100 included in the liquid crystal light valve 260 is subjected to a switching control by the driving circuit that operates based on an image signal for blue.

Resulting from the above, the red light component, the green light component, and the blue light component are respectively modulated by the liquid crystal light valves 240, 250, and 260, thereby respectively forming the image for red, the image for green, and the image for blue.

The image for red formed by the liquid crystal light valve 240, that is, red light from the liquid crystal light valve 240 enters the dichroic prism 210 from a surface 213 and is reflected toward the left in FIG. 18 by the dichroic mirror surface 211. The red light then passes through the dichroic mirror surface 212, and outputs from a light emitting surface 216.

Further, the image for green formed by the liquid crystal light valve 250, that is, green light from the liquid crystal light valve 250 enters the dichroic prism 210 from a surface 214. The green light then passes through the dichroic mirror surfaces 211 and 212, and outputs from the light emitting surface 216.

Further, the image for blue formed by the liquid crystal light valve 260, that is, blue light from the liquid crystal light valve 260 enters the dichroic prism 210 from a surface 215 and is reflected toward the left in FIG. 18 by the dichroic mirror surface 212. The blue light then passes through the dichroic mirror surface 211, and outputs from the light emitting surface 216.

Accordingly, the light in each color outputted from the liquid crystal light valves 240, 250, and 260, that is, the images respectively formed by the liquid crystal light valves 240, 250, and 260 are synthesized by the dichroic prism 210, thereby forming a color image. The image is projected (enlarged and projected) on the screen 320 placed in a predetermined position by the projection lens 220.

An electronic apparatus provided with the liquid crystal panel 100 as described above can display a high quality image while having excellent reliability.

Here, the electronic apparatus of the invention is not only applied to the personal computer (a mobile type personal computer) in FIG. 15, the mobile phone in FIG. 16, the digital still camera in FIG. 17, and the projection display device in FIG. 18, but also applied to the following instruments: TVs, video cameras; viewfinder type or direct monitor type videotape recorders; automobile navigation devices; pagers; electronic notes (including communication function); electronic dictionaries; electronic calculators; electronic game devices; word processors; workstations; TV phones; TV monitors for security; electronic binoculars; POS terminals; instruments with touch panels such as cash dispensers in finance institutions and vending machines; medical instruments such as electronic thermometers, blood-pressure gauges, blood glucose gauges, electrocardiograph displays, ultrasound diagnostic devices, and endoscopic displays; fish detectors; various measuring instruments; measuring gauges for automobiles, air planes, and ships; and flight simulators. Obviously, the electro-optical display device can be applied as a display or monitor portion of these various electronic apparatuses.

An electro-optical display device and an electronic apparatus that are provided with the active matrix device 10 as described above can display a high quality image while achieving energy savings.

The active matrix, the electro-optical display device, and the electronic apparatus of the invention have been described based on the embodiment shown in the drawings, but the invention is not limited thereto.

For example, the active matrix device, the electro-optical display device, and the electronic apparatus of the invention may include any substitute that has the same function as its original structure and may include any additional structure.

For example, in the embodiments described above, the first wiring lines 11 and the second wiring lines 12 are formed on the opposite side of the substrate 50 with respect to the switching elements 1 (i.e. the switching elements 1 are formed between the first and second wiring lines 11 and 12 and the substrate 50). However, the first and second wiring lines 11 and 12 may be formed between the switching elements 1 and the substrate 50. In this case, in the manufacturing steps described above, the second wiring lines 12, the third insulating film 72A, the first wiring lines 11, and the fourth insulating film 73A may be formed before the first insulating film 41A is formed, and a through electrode portion may be appropriately formed.

Further, in the embodiment described above, a case where positions (center positions) to form the electrodes 2, 3, and 5 of the switching elements 1 are nearly aligned in the thickness direction of the substrate 50 has been described. However, it is not limited to this as long as the fixed electrode 3 and the driving electrode 2 can respectively face the movable electrode 5. Therefore, the positions (center positions) to form the electrodes 2, 3, and 5 of the switching elements 1 may not be aligned in the thickness direction of the substrate 50. In this case, for example, in the manufacturing steps described above, only the movable electrode 5 is formed on a side surface of the groove 411, while an insulating film is formed on the wall surface of the groove 411 so as to form a groove that is slightly shallower and narrower than the groove 411. Then the fixed electrode 3 and the driving electrode 2 may be formed on the side surface (on the insulating film) of the groove.

Further, in the embodiments described above, a case where the projection display device (electronic apparatus) includes three liquid crystal panels each employing the electro-optical display device has been described. However, at least one of the liquid crystal panels may be required to be the electro-optical display device (liquid crystal panel) according to the embodiments of the invention. In this case, the electro-optical display device according to the embodiments of the invention is preferably applied to at least the liquid crystal panel used for the liquid crystal light valve for blue.

Further, in the embodiments described above, a case where the electro-optical display device according to the invention is applied to the transmissive electro-optical display device. However, the invention is not limited to the above, and thus can be applicable to a reflective electro-optical display device such as liquid crystal on silicon (LCOS).

What is claimed is:

1. An active matrix device, comprising:
    a substrate;
    a pixel electrode formed at a side adjacent to one of surfaces of the substrate;
    a switching element, including:
        a fixed electrode formed so as to correspond to the pixel electrode and coupled with the pixel electrode;
        a movable electrode formed so as to be displaced toward the fixed electrode along a surface direction of the substrate to be in one of states being in contact with the fixed electrode and apart from the fixed electrode;
        a driving electrode formed so as to form an electrostatic gap between the movable electrode and the driving electrode, the fixed electrode, the movable electrode, and the driving electrode being disposed in different positions from each other along the surface direction of the substrate;
    a first wiring line coupled with the movable electrode; and
    a second wiring line coupled with the driving electrode,
        wherein the switching element generates an electrostatic attraction between the movable electrode and the driving electrode by applying a voltage between the movable electrode and the driving electrode so as to displace the movable electrode to be in contact with the fixed electrode for obtaining electrical conduction between the first wiring line and the pixel electrode,
    wherein the pixel electrode is formed in a different position from a position of each of the fixed, movable and driving electrodes of the switching element in a thickness direction of the substrate so as to cover and include each of the fixed, movable and driving electrodes that correspond to the pixel electrode in plan view.

2. The active matrix device according to claim 1, wherein the fixed electrode, the movable electrode, and the driving electrode are formed in a sheet-like shape and disposed so that each surface of the fixed electrode, the movable electrode, and the driving electrode is nearly orthogonal to the surface of the substrate.

3. The active matrix device according to claim 1, wherein the fixed electrode, the movable electrode, and the driving electrode are form to extend in a direction parallel to one of the first wiring line and the second wiring line.

4. The active matrix device according to claim 1, wherein the movable electrode 5 is cantilever-supported so that a free end is displaced, and the fixed electrode is disposed so as to face an end portion of the movable electrode at a side adjacent to the free end, while the driving electrode is disposed so as to face a portion of the movable electrode closer to a side adjacent to a fixed end of the movable electrode than a position of the fixed electrode.

5. The active matrix device according to claim 1, wherein the fixed electrode, the movable electrode, and the driving electrode are arranged so that the movable electrode contacts the fixed electrode while the movable electrode and the driving electrode are apart from each other.

6. The active matrix device according to claim 5, wherein at least one of surfaces of the movable electrode and the fixed electrode that are facing to each other has a protrusion to prevent a contact of the movable electrode with the driving electrode.

7. The active matrix device according to claim 1, wherein the switching element further includes a housing portion having an air-tight space and accommodating the movable electrode, the driving electrode, and the fixed electrode therein.

8. The active matrix device according to claim 1, wherein the first wiring line is formed in a plural number so as to be parallel to each other along the substrate, while the second wiring line is formed in a plural number so as to be parallel to each other along the substrate and intersect with the first wiring lines, and the switching element is formed in a vicinity of each of intersections of the first wiring lines and the second wiring lines.

9. A method for manufacturing the switching element included in the active matrix device according to claim 1, comprising:
    forming a step portion having a wall surface formed on one of the surfaces of the substrate, the wall surface being perpendicular to the surface of the substrate;
    forming a first electrode on the wall surface;
    forming an insulating layer having an insulating property so as to cover the first electrode;
    forming a second electrode on the insulating layer so as to face the first electrode through the insulating layer; and
    removing a part of the insulating layer so as to form an electrostatic gap between the first electrode and the second electrode and allow the second electrode to be displaced to be in one of states being in contact with the first electrode and apart from the first electrode, wherein the first electrode serves as the driving electrode while the second electrode serves as the movable electrode.

10. An electro-optical device, comprising the active matrix devise according to claim 1.

11. An electronic apparatus comprising the electro-optical device according to claim 10.

* * * * *